US007793318B2

(12) United States Patent
Deng

(10) Patent No.: US 7,793,318 B2
(45) Date of Patent: Sep. 7, 2010

(54) DIGITAL VIDEO SIGNATURE APPARATUS AND METHODS FOR USE WITH VIDEO PROGRAM IDENTIFICATION SYSTEMS

(75) Inventor: Kevin Deng, Safety Harbor, FL (US)

(73) Assignee: The Nielsen Company, LLC (US), Schaumburg, IL (US)

( * ) Notice: Subject to any disclaimer, the term of this patent is extended or adjusted under 35 U.S.C. 154(b) by 1194 days.

(21) Appl. No.: 11/372,582

(22) Filed: Mar. 10, 2006

(65) Prior Publication Data

US 2006/0153296 A1 Jul. 13, 2006

Related U.S. Application Data

(63) Continuation of application No. PCT/US03/29219, filed on Sep. 12, 2003.

(51) Int. Cl.
*H04N 60/22* (2006.01)
*H04N 7/10* (2006.01)
*H04N 7/025* (2006.01)

(52) U.S. Cl. ............................. 725/19; 725/20; 725/33

(58) Field of Classification Search .................. 725/19, 725/20, 33
See application file for complete search history.

(56) References Cited

U.S. PATENT DOCUMENTS 5,019,899 A 5/1991 Boles et al.
5,319,453 A 6/1994 Copriviza et al.
5,374,951 A 12/1994 Welsh
5,436,653 A 7/1995 Ellis et al.
5,437,050 A 7/1995 Lamb et al.
5,481,294 A 1/1996 Thomas et al.
5,504,518 A 4/1996 Ellis et al.
5,512,933 A 4/1996 Wheatley et al.
5,572,246 A 11/1996 Ellis et al.
5,594,934 A 1/1997 Lu et al.
5,612,729 A 3/1997 Ellis et al.
5,621,454 A 4/1997 Ellis et al.
5,710,833 A 1/1998 Moghaddam et al.

(Continued)

FOREIGN PATENT DOCUMENTS

EP 0 161 512 11/1985

(Continued)

OTHER PUBLICATIONS

"MPEG Video Compression Technique," www.rnvs.informatik.tu-chemnitz.de/~jan/MPEG/HTML/mpeg_tech.html downloaded 2003, 9 Pages.

(Continued)

*Primary Examiner*—Hunter B. Lonsberry
(74) *Attorney, Agent, or Firm*—Hanley, Flight & Zimmerman, LLC

(57) ABSTRACT

Digital video signature apparatus and methods for use with video program identification systems are disclosed. The disclosed apparatus and methods identify a video program using a sequence of signatures. Each of the signatures includes a set of centroids corresponding to one of a plurality of frames of the video program. The apparatus and methods compare the sequence of signatures to a set of reference sequences of signatures and identify the video program based on the comparison of the sequence of signatures to the set of reference sequences of signatures.

23 Claims, 12 Drawing Sheets

U.S. PATENT DOCUMENTS 5,734,720 A 3/1998 Salganicoff
5,767,893 A 6/1998 Chen et al.
5,767,922 A 6/1998 Zabih et al.
5,787,334 A 7/1998 Fardeau et al.
5,822,436 A 10/1998 Rhoads
5,856,973 A 1/1999 Thompson
5,864,837 A 1/1999 Maimone
5,870,754 A 2/1999 Dimitrova et al.
5,872,588 A 2/1999 Aras et al.
5,978,842 A 11/1999 Noble et al.
5,982,932 A 11/1999 Prokoski
6,100,941 A * 8/2000 Dimitrova et al. ........... 348/700
6,184,918 B1 2/2001 Goldschmidt et al.
6,467,089 B1 10/2002 Aust et al.
6,469,749 B1 10/2002 Dimitrova et al.
6,496,228 B1 12/2002 McGee et al.
6,504,870 B2 1/2003 Srinivasan
6,513,161 B2 1/2003 Wheeler et al.
6,523,175 B1 2/2003 Chan
6,542,620 B1 4/2003 Rhoads
6,546,051 B2 4/2003 Ramaswamy
6,560,349 B1 5/2003 Rhoads
6,567,780 B2 5/2003 Rhoads
6,574,594 B2 6/2003 Pitman et al.
6,593,976 B1 7/2003 Lord
6,604,072 B2 8/2003 Pitman et al.
6,621,881 B2 9/2003 Srinivasan
6,633,651 B1 10/2003 Hirzalla et al.
6,675,383 B1 1/2004 Wheeler et al.
2001/0005823 A1 6/2001 Fischer et al.
2001/0053190 A1 12/2001 Srinivasan
2002/0010919 A1 1/2002 Lu et al.
2002/0026635 A1 2/2002 Wheeler et al.
2002/0034224 A1 3/2002 Srinivasan
2002/0059577 A1 5/2002 Lu et al.
2002/0083060 A1 6/2002 Wang et al.
2002/0087969 A1 7/2002 Brunheroto et al.
2002/0120925 A1 8/2002 Logan
2002/0129368 A1 9/2002 Schlack et al.
2002/0133499 A1 9/2002 Ward et al.
2002/0178410 A1 11/2002 Haitsma et al.
2003/0005430 A1 1/2003 Kolessar
2003/0018977 A1 1/2003 McKenna
2003/0056211 A1* 3/2003 Van Den Heuvel ............ 725/25
2003/0066070 A1 4/2003 Houston
2003/0086341 A1 5/2003 Wells
2003/0101449 A1 5/2003 Bentolila et al.
2003/0101451 A1 5/2003 Bentolila et al.
2003/0131350 A1 7/2003 Peiffer et al.

FOREIGN PATENT DOCUMENTS

EP 0 703 683 9/1995
EP 1 041 767 4/2000
GB 9905601.2 12/1999
WO 9322875 11/1993
WO 9512278 5/1995
WO 9832251 7/1998
WO 99/33206 7/1999
WO 9959275 11/1999
WO 0002387 1/2000
WO 01/61892 8/2001
WO 02/37316 5/2002
WO 02052759 7/2002
WO 03/007235 1/2003
WO 03/060630 7/2003

OTHER PUBLICATIONS

Tudor, P.N., "MPEG-2 Video Compression," Electronics & Communication Engineering Journal, Dec. 1995, downloaded Mar. 28, 2006, 15 Pages.
Written Opinion corresponding to International Application No. PCT/US03/29219, mailed Jan. 27, 2006, 5 Pages.
Written Opinion corresponding to International Application No. PCT/US03/29219, mailed Jul. 8, 2005, 4 Pages.
Search Report corresponding to International Application No. PCT/US203/29219, mailed Jan. 27, 2004. 5 Pages.
"MPEG Video Encoding Techniques" www.ecs.soton.ac.uk/~cpb/oldsite/work/ug/mpeg_report/mpeg.html, downloaded Apr. 3, 2006, 10 Pages.
"What is CIE 1976 (L* a* b*) colour space?," www.colourware.co.uk/cpfaq/q3-21.htm, downloaded Apr. 3, 2006, 2 Pages.
"What is CIELab?," www.bodoni.co.uk/colorcielab.html, downloaded Mar. 17, 2003, 1 Page.
"The RGB (CMY) Color Model", www.adobe.com/support/techguides/color/colormodels/rgbcmy.html, downloaded Mar. 17, 2003, 6 Pages.
"CIELAB", www.adobe.com/support/techguides/color/colormodels/cielab.html, downloaded Mar. 17, 2003, 2 Pages.
"CIELAB Color Conversion", www.aols.com/colorite/cielabcolorconv.html, downloaded Mar. 17, 2003, 1 Page.
"A Robust Content Based Digital Signature for Image Authentication", Schneider et al., 1996, 4 Pages.
"Robust Audio Hashing for Content Identification", Haitsma et al., Sep. 2001, 8 Pages.
Patent Cooperation Treaty, International Preliminary Examination Report for PCT/US2003/029219, Feb. 23, 2007, 18 pages.
Mexican Office Action, issued by the Instituto Mexicano de la Propiedad Industrial on Dec. 7, 2009, in connection with Mexican patent application No. PA/a/2006/002837, 3 pages.

* cited by examiner

DIGITAL VIDEO SIGNATURE APPARATUS AND METHODS FOR USE WITH VIDEO PROGRAM IDENTIFICATION SYSTEMS

This is a continuation of PCT Application Serial No. PCT/US03/29219 filed Sep. 12, 2003.

FIELD OF THE DISCLOSURE

The present disclosure relates generally to identifying digital video information and, more specifically, to digital video signature apparatus and methods for use with video program identification systems.

BACKGROUND

Systems that identify video images and/or sequences of video images (e.g., television commercials or programs) being broadcast and/or viewed on an output device (e.g., a television or video monitor) are often used to verify that certain audio and/or video content or programs (e.g., television programs, advertisements, etc.) have been broadcast in particular geographic regions at particular times. Of course, such video identification system may additionally or alternatively be used to facilitate the analysis of viewing behaviors of selected groups of viewers. Some video identification systems identify programs by extracting audio and/or video information associated with a program currently being broadcast and/or viewed and processing that extracted information to generate audio and/or video signatures. Typically, the audio and/or video signatures are digital sequences or codes that, at a given instant of time, are substantially unique to each portion of audio/video content or program. In this manner, an unidentified video program can be reliably identified by finding a matching signature within a database or library containing the signatures of known available programs. When a matching signature is found, the previously unidentified audio/video content (e.g., television program, advertisement, etc.) is identified as the one of the known available programs corresponding to the matching database signature.

Video signatures may be generated for analog and/or digital video programs. Some known video signature generation techniques for use with digital video program information process some or all of the uncompressed image data for one or more video frames to generate one or more signatures for the video program associated with the video frames. However, using uncompressed video data to generate signature information usually requires expensive high-speed signature generation hardware or circuitry, or software/processor-based signature generation techniques that result in relatively slow signature generation rates. For some applications, such as, for example, television audience viewing behavior analysis or other program verification or identification systems that use data acquisition and signature generation devices, high speed hardware-based video signature generation systems are cost prohibitive. In addition, many software-based signature generation systems are too slow and may miss important verification and/or viewing information such as, for example, relatively short television commercials or the like.

In some software-based systems, the speed at which video signatures are generated may be increased by using less video information (e.g., fewer frames, smaller portions of each frame, etc.) to generate the signature information. However, the use of less information usually results in a signature that is less likely to uniquely represent the associated video content, thereby resulting in an increased false match rate (i.e., incorrectly identifying a video program) and an increased failure to find a match when a match exists (i.e., the failure to identify a known video program).

Still further, the video signature generation systems used with many video program identification systems are not independent of image format or encoder operation. For example, changing the display aspect ratio (e.g., from 4:3 to 16:9) for a video program may significantly change the video signature information generated therefrom. As a result, while these known systems may be able to reliably identify a group of known images/frames and, thus, known programs when formatted for a 4:3 aspect ratio display, these same systems may fail to identify any of those known programs when formatted using a different aspect ratio. Similarly, many of these known systems are also sensitive to video program frame rate (e.g., the number of frames per second that compose a video program). For example, while many known systems may be able to reliably identify video programs that are composed of frames or images that are to be displayed at a rate of thirty frames per second, those same systems may be unable to identify those same programs when composed of more or fewer frames or images per second.

DETAILED DESCRIPTION

Figure 1:
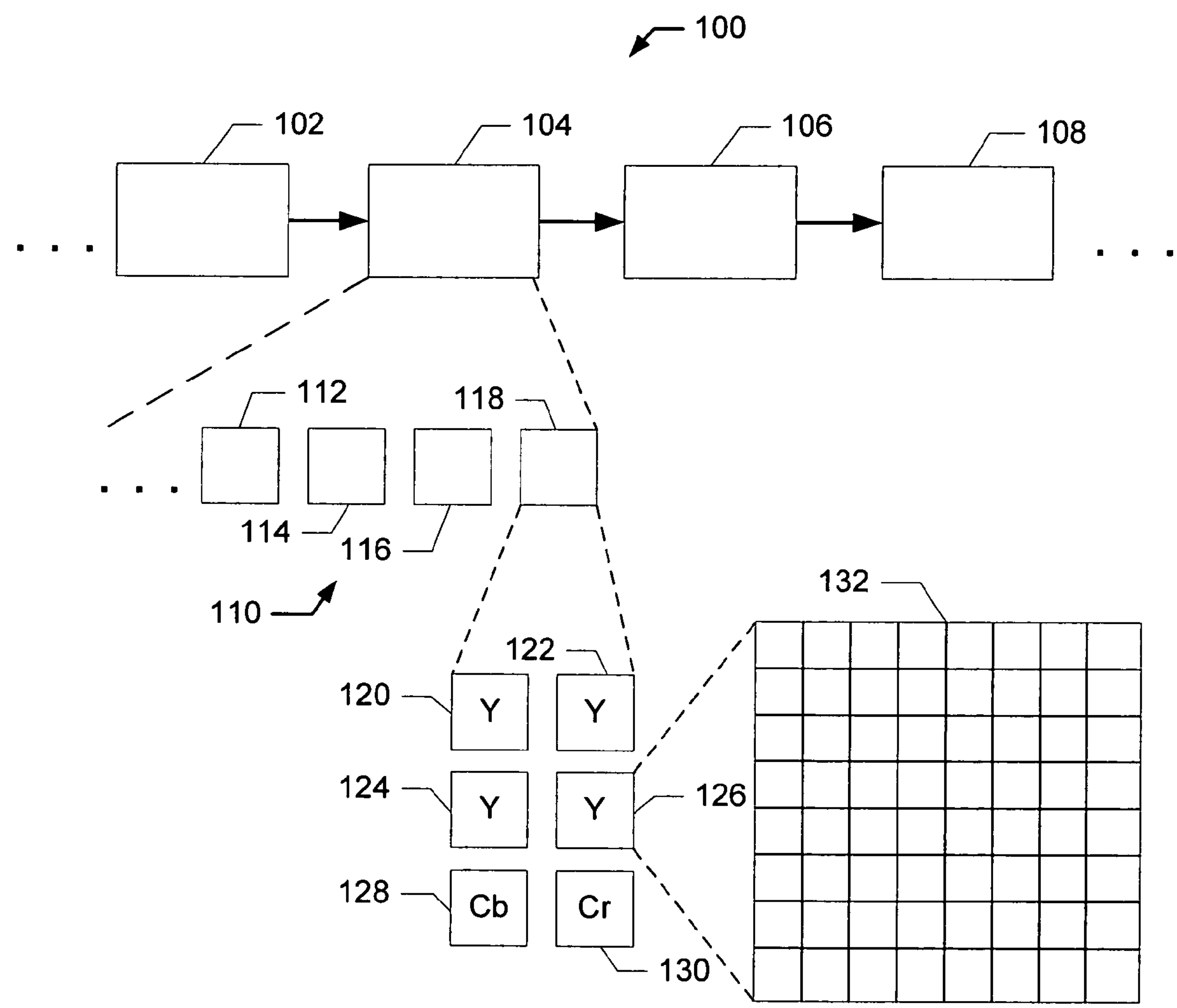
FIG. 1 depicts an example sequence of compressed digital video images or frames that may be associated with a digital television program.

The example video signature methods and apparatus disclosed herein can be used to generate signature information for a sequence of images or frames composed of compressed digital video information. The generated signature information may subsequently be compared to reference signature information to identify a video program from which the sequence of images or frames originated. However, before discussing the example video signature apparatus and methods in detail, a brief discussion relating to digital video signal compression is provided below.

The following discussion is based primarily on the Moving Pictures Expert Group (MPEG) video compression standard. The MPEG standard is one particularly well-known digital video compression standard that may be used in conjunction with the example signature generation methods and apparatus described herein. However, MPEG video compression techniques are only one particular manner in which digital video information may be compressed prior to its use with the example signature generation methods and apparatus disclosed herein. Those having ordinary skill in the art will appreciate that the example video signature apparatus and methods disclosed herein may be similarly applied in conjunction with other digital video compression schemes.

In general, video compression schemes operate based on the assumption that video sequences or programs typically contain a relatively large amount of temporally and/or spatially redundant information. Temporal redundancy occurs between successive frames or images making up a video sequence because there are relatively few changes to the color and brightness of large portions of the successive images or frames making up the video sequence. On the other hand, spatial redundancy occurs within a given video frame or image because adjacent pixels or areas within an image or frame are often of the same or similar color and intensity or brightness. Thus, by eliminating temporally and spatially redundant video information from a video program prior to its transmission, the amount of bandwidth required to transmit the video program can be reduced dramatically.

The data reduction achieved by a compression scheme is commonly expressed as a compression ratio. Compression ratios are usually calculated by dividing the amount of video data making up an original sequence of video images by the amount of compressed data used to transmit that video data. Compression ratios of between about 8:1 and about 30:1 are commonly achieved using an MPEG-based video compression scheme.

Video compression schemes also typically eliminate certain types and amounts of video information that are not necessarily redundant and which may be eliminated without being perceptibly noticeable or offensive to the human eye. For example, the human eye is significantly more sensitive to variations in brightness than variations in color or hue. As a result, as described below, video compression schemes often reduce the amount of digital information pertaining to color or hue without adversely impacting the perceived quality of an image extracted from compressed image information. In addition, the human eye has greater difficulty perceiving rapid variation of brightness and/or color, shade or hue across an image (i.e., the higher frequency components that compose an image). As a result, as described below, video compression schemes can zero-out and/or eliminate the transmission or processing of the higher frequency components of an image without adversely impacting the perceived quality of the image.

FIG. 1 depicts an example sequence 100 of digital video images or frames 102, 104, 106 and 108 that may be associated with a digital television program or the like. The images or frames 102-108 may make up a group of pictures (GOP) for purposes of MPEG encoding (i.e., compression) to be transmitted, stored or otherwise conveyed for use by an MPEG decoder associated with an output device (e.g., a television, video monitor, computer screen, etc.)

Initially, each of the images or frames 102-108 is composed of uncompressed digital information representing display pixels arranged in a plurality of rows and columns to be displayed on an output device in a particular format at a particular rate. For example, each of the frames 102-108 may contain sufficient pixel information to display images or frames on a raster scan-based display having 480 rows or lines of 720 pixels (i.e., columns) at a rate of 30 frames per second. Of course, many other display formats and rates could be used instead.

The amount of digital data required to represent each pixel within each of the frames or images 102-108 depends on the color model used to create the images 102-108. For example, in the case where the well-known Red, Green, Blue (RGB) color model is used, eight bits are used to represent the amount of each image or color component used for each pixel. Thus, for a digital image generated using the RGB color model, a total of twenty-four bits of data are required to represent each pixel.

During the MPEG compression processes, each of the images or frames 102-108 is ultimately sub-divided into a sequence of macro blocks, each of which is composed of 16×16 pixels (i.e., sixteen rows of sixteen pixels). The resulting sequences of macro blocks are maintained in a raster scan order. By way of example, the image or frame 104 is sub-divided into a sequence of macro blocks 110 that is composed of at least macro blocks 112, 114, 116 and 118, each of which includes RGB data for 16×16 or 256 pixels.

The MPEG compression process converts the RGB data (i.e., the twenty-four bits of information) for each pixel within the macro blocks 112-118 into the well-known YUV color model. In general, the YUV color model represents each pixel using a luminance value denoted as Y and two chrominance values denoted as Cr and Cb. However, because the human eye is significantly less sensitive to color changes, the MPEG compression process decimates the chrominance information for each of the macro blocks via a horizontal and vertical (i.e., row and column) sub-sampling process. In particular, the decimation process averages the chrominance information (i.e., the Cr and Cb values) for groups of four pixels arranged in two rows and two columns, discards the individual chrominance values making up the averages and retains the average values. In this manner, the MPEG compression process compresses the chrominance information required to display an image by a factor of four without adversely affecting the perceptible quality of the image when displayed to a human.

By way of example, following the color model conversion and chrominance decimation processes, the macro block 118 includes four 8×8 luminance blocks 120, 122, 124 and 126 and two 8×8 chrominance blocks 128 and 130, together representing the color and intensity of the group of 16×16 pixels associated with the macro block 118. Each of the blocks 120-130 is composed of eight rows and eight columns of eight bit values (i.e., bytes). For example, the luminance block 126 is composed of a grid 132 where each of the squares of the grid 132 represents an eight bit luminance value associated with a particular pixel within the macro block 118. Of course, because the chrominance information has been decimated as described above, each of the eight bit values within the 8×8 chrominance blocks 128 and 130 represents the average color information for a group of four pixels associated with the macro block 118.

After converting the color model and decimating the chrominance information, the MPEG compression scheme processes the images or frames 102-108, which are now represented using the decimated YUV data, to eliminate or reduce temporal redundancy. The MPEG compression scheme uses motion-compensated inter-frame prediction to reduce the amount of data required to regenerate a sequence of video frames. In general, the MPEG compression scheme periodically generates reference frames (known as Intra-frames or I-frames) that are essentially still video images that can be regenerated (i.e., displayed) without reference to any other frames or images. A series of video frames preceding and/or following a reference frame or I-frame are either Predictive-frames (commonly known as P-frames) or Bidirectionally predictive-frames (commonly known as B-frames). P-frames contain motion vectors and error information relating the P-frame to an I-frame or to a preceding P-frame, while B-frames contain motion vectors and error information relating to preceding and/or subsequent I-frames or P-frames. Because substantial portions (e.g., a background) of a video image typically do not change significantly (or at all) from one frame to the next (i.e., there is a significant amount of temporal redundancy), the amount of information needed to represent each P-frame and B-frame can be significantly less than the amount of information needed to represent an I-frame.

During an MPEG compression process, each of the frames or images 102-108 making up the video sequence 100 are designated by the MPEG encoder as one of an I-frame, a P-frame or a B-frame. The relatively complex manner in which the MPEG compression process designates frames as I-frames, P-frames and B-frames is well-known in the art and is not described in further detail herein. However, for purposes of understanding the example video signature generation apparatus and methods disclosed herein, it should be recognized that the creation of P-frames and B-frames occurs on a block-by-block basis (i.e., one macro block at a time). As a result, if during the MPEG compression process it is recognized that predicting a particular macro block within a P-frame or a B-frame will not improve compression, that particular macro block will be intra-coded (i.e., not predicted but, rather, fully described using actual luminance and chrominance data that can be directly converted for display purposes).

Once the MPEG compression process has reduced or eliminated temporally redundant inter-frame information by converting a sequence of video images into a sequence of I-frames, P-frames and B-frames, the MPEG compression scheme processes these frames to remove spatial redundancy. The MPEG compression scheme recognizes that within a given 16×16 pixel macro block there is typically a repeatable pattern of pixel information and/or the pixel information does not vary significantly (e.g., perceptibly) across the macro block.

To eliminate the spatially redundant information, the MPEG compression scheme uses a discrete cosine transform (DCT) to convert each of the 8×8 blocks making up the macro blocks of the I-frames, P-frames and B-frames from the spatial domain into the frequency domain. In the spatial domain, each square (i.e., byte) within an 8×8 block corresponds to a physical pixel location, whereas in the frequency domain, each square within the 8×8 block produced by the DCT conversion corresponds to a frequency of a cosine waveform. Because there is typically very little variation in intensity and color across a 16×16 pixel macro block, most macro blocks can be represented in the frequency domain using a direct current (DC) component (i.e., a zero frequency component or offset) and few, if any, low frequency components. As is well known, the DCT of an 8×8 block of spatial pixel information (e.g., an 8×8 block of luminance information where each square within the block represents an eight bit value associated with a physical pixel location) results in an 8×8 block of frequency domain information, where each square contains an amplitude coefficient for a cosine waveform of a particular frequency. The upper left corner of the frequency domain block is a DC value (e.g., the average luminance for the 8×8 spatial domain block), and the horizontal frequency increases moving across rows to the right of the upper left corner and the vertical frequency increases moving down columns. As described in greater detail below, the upper left corner of the frequency domain block (i.e., the DC coefficient value) also represents the value associated with the pixel in the upper left corner of the block in the spatial domain. However, frequency coefficients within the frequency domain block other than the DC coefficient do not correspond identically to pixel values in the spatial domain. Thus, in general, if spatial or pixel value information is needed for a given block, a conversion of the frequency domain block to spatial domain is required.

In practice, performing a DCT and quantization on each of the 8×8 blocks results in frequency domain blocks having relatively few coefficient values near the upper left corner of the 8×8 frequency domain blocks and a relatively large number of zero value or same value coefficients in the majority of the squares making up the remainders of the blocks. By using a run-length encoding scheme and not individually transmitting the coefficients having the same value (e.g., coefficients having a value of zero), the MPEG compression process can substantially reduce the amount of data needed to reconstitute the compressed image without perceptibly degrading the image quality.

To illustrate the manner in which spatially redundant information can be eliminated, consider an 8×8 block of pixel luminance information such as, for example, the block 126 of FIG. 1. If the luminance is constant (e.g., a digital value of 128) across the block 126, each of the luminance values associated with the 64 squares making up the grid 132 will contain the value 128. Performing a DCT on such an 8×8 block will result in an 8×8 block in which the upper left corner square contains the DC value 128 and all other squares or frequency domain coefficients are equal to zero. Thus, in the frequency domain, only a single value needs to be used (and transmitted) to represent the luminance values for all of the pixels associated with the original 8×8 spatial domain block. In other words, 63 eight bit luminance values do not have to be transmitted and processed by an MPEG decoder. Instead, using a run-length encoding scheme, a single value (i.e., 128) may be transmitted and a run length of 63, (indicating 63 zeros), may be transmitted to the MPEG decoder.

In general, the MPEG compression process achieves relatively high compression ratios by employing techniques such as, for example, frequency coefficient quantization (e.g., reducing the number of bits needed or allocated for each frequency domain coefficient), and zigzag sequence coding in conjunction with run-length encoding to eliminate the individual transmission of coefficients having the same value. However, such techniques are well-known in the art and, thus, are not discussed further herein.

Figure 2:
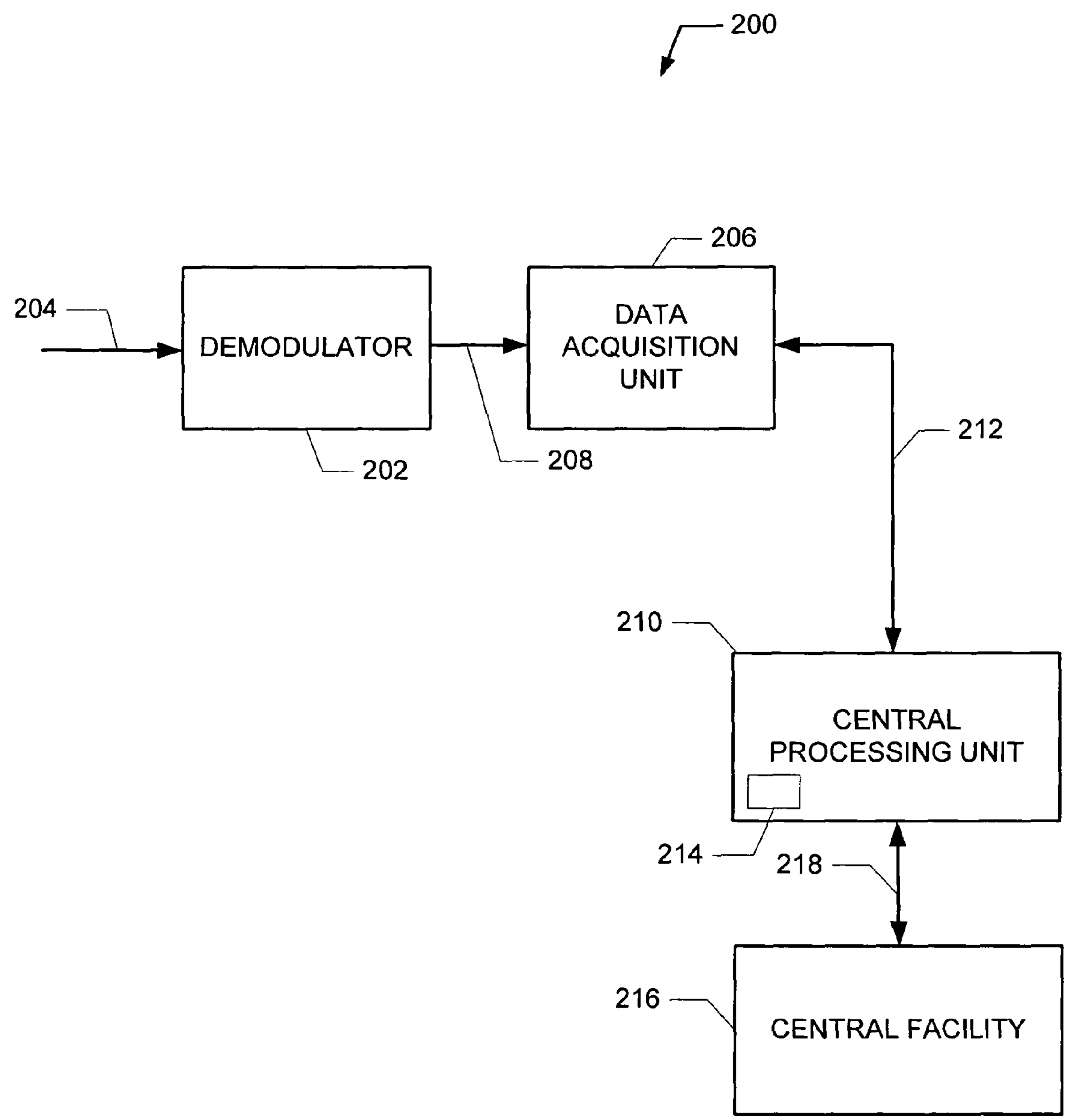
FIG. 2 is a block diagram of an example system that may employ the example digital video signature generation apparatus and methods described herein to identify video programs.

FIG. 2 is a block diagram of an example system 200 that may employ the example digital video signature generation apparatus and methods described herein to identify video programs. The system 200 includes a demodulator 202 that receives a digital program data stream 204. The digital program data stream 204 may be a multi-program data stream that is broadcast via any desired method. For example, the digital program data stream 204 may be a multi-program digital television data stream that is broadcast using any desired combination of wireless communication links such as, for example, satellite communication links, cellular communication links, or other wireless terrestrial communication links. Alternatively or additionally, the digital program data stream 204 may be transmitted via any desired combination of hardwired communication paths including cables, phone lines, etc.

For purposes of the following discussion, the example digital program data stream 204 is assumed to include one or more digital video programs that have been compressed and formatted according to the MPEG standard as described by way of example in connection with FIG. 1. The MPEG packets making up the video frame or image information for each of the digital video programs may be encapsulated using any desired transport protocol.

The demodulator 202 may extract a base band signal containing a multi-program digital data stream and a transport circuit for reconstructing data packets associated with a desired program from the digital program data stream 204. When the demodulator 202 is tuned to a particular channel, it reconstructs the MPEG data packets from the digital program data stream 204 that corresponds to the selected program.

The system 200 also includes a data acquisition unit 206 that is coupled to the demodulator 202. The data acquisition unit 206 selects compressed digital video information 208 (e.g., MPEG I-frames, P-frames and B-frames) associated with a video program currently output by the demodulator 202. As described in greater detail below, the data acquisition unit 206 selects frames or images from the compressed digital video information 208 that are substantially intra-coded (i.e., frames or images containing a substantial percentage of intra-coded macro blocks) and generates signature information for the video program based on those substantially intra-coded frames or images. More specifically, the data acquisition unit 206 extracts scaled image information (e.g., by extracting the DC coefficient information) from the selected substantially intra-coded frequency domain blocks and uses the scaled image information to calculate center of mass or centroid information for each of the brightness and color components for each of a series of the substantially intra-coded images or frames. Each of the images or frames may also be recursively sub-divided into a plurality of sub-regions or areas and center of mass information may be similarly generated for each of the sub-regions or areas. In any event, each substantially intra-coded frame or image can be substantially uniquely represented by a signature composed of a plurality of centers of mass or centroid values associated with the components (e.g., colors, brightness, etc.) of the overall image or frame and any defined sub-regions or areas of the image or frame.

The data acquisition unit 206 is communicatively coupled to a central processing unit 210 via a communication link 212. The communication link 212 may be implemented using any desired combination of hardwired and wireless communication links and any desired combination of communication protocols or schemes. For example, the communication link 212 may be implemented as a local area network, or any other network, and/or may include the use of phone lines, a packet switched network such as, for example, the Internet, or any other types of communication links.

The central processing unit 210 also includes a non-volatile memory or mass storage device 214. The memory or mass storage device 214 may be implemented using, for example, a disk drive that stores digital information using a magnetic or optical media. Additionally or alternatively, the memory or mass storage device 214 may be implemented using an electrically erasable programmable read only memory (EEPROM) or the like. Although not shown in FIG. 2, additional data acquisition units similar or identical to the data acquisition unit 206 may be communicatively coupled to the central processing unit 210.

The data acquisition unit 206 sends signatures generated (as generally set forth above) in connection with a sequence of video images or frames associated with a currently selected video program to the central processing unit 210 via the communication link 212. The central processing unit 210 is configured to compare the sequence of signatures received from the data acquisition unit 206 to a plurality of known or reference signatures that are associated with known video programs and which are stored within a data structure (e.g., a table) within the non-volatile memory 214. In the event that the central processing unit 210 determines that a signature sequence received from the data acquisition unit 206 matches or substantially matches a reference signature sequence associated with a known video program, the central processing unit 210 identifies the video program selected by the demodulator 202.

The demodulator 202 and the data acquisition unit 206 may be located within a private home or other residence or, alternatively, may be located within a business facility or any other structure. Preferably, the system 200 is located so that the broadcast signals that are to be consumed and/or verified can be easily detected and received. Of course, other such decoders and data acquisition units (none of which are shown) may be similarly located within other locations and communicatively coupled to the central processing unit 210 via the communication link 212 and/or via other communication links (none of which are shown). In this manner, statistically significant viewing behavior and/or program verification information for a designated population of persons or geographic area may be ascertained by the central processing unit 210.

The system 200 may further include a central facility 216 that communicates with the central processing unit 210 via a communication link 218, which may be implemented using a wide area network including phone lines, wireless communications and/or any other desired communication media and/or protocols. The link 218 may be implemented using a wide area network including phone lines, wireless communications and/or any other desired communication media and/or protocols. The central facility 216 may process signature information and/or other program-related information received from the central processing unit 210 and/or other processing units (none of which are shown). For example, in the event that the central processing unit 210 fails to identify a program, video clip, etc., using signature information, that signature information and the associated video clip may be conveyed to the central facility 216 via the link 218. At the central facility 216 the signature information may be compared to signatures stored within a library of signatures within (or at least accessible to) the central facility 216. Such a signature library may be complied by receiving signature information from a variety of sources such as, for example, other central processing units (not shown) and/or data acquisition units (not shown). Additionally or alternatively, if the signature information received by the central facility 216 does not match any of the signature information already present in the library accessible to or within the central facility 216, the program, video clip, etc. associated with the signature information is viewed and identified by a human operator. The human operator may then add a signature for that program, video clip, etc. to the signature library.

While the data acquisition unit 206 is shown in FIG. 2 as a separate structure, the functions of the data acquisition unit 206 may instead be integrated within the demodulator 202 or the central data processing unit 210. Alternatively, the functions of the data acquisition unit 206 could be distributed between the demodulator 202, the central processing unit 210 and/or other similar or identical units within or at least accessible by the system 200.

Figure 3:
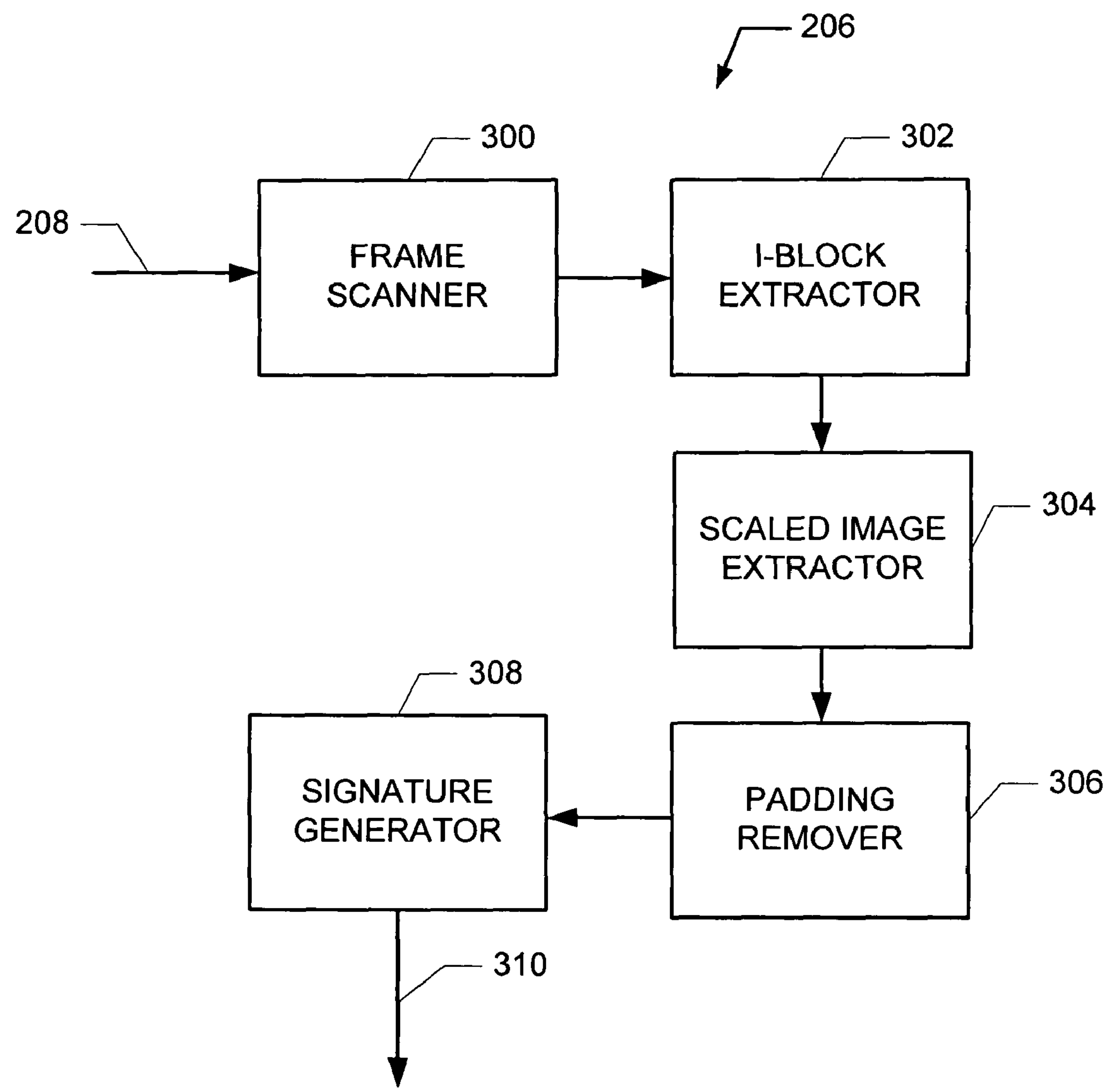
FIG. 3 is a more detailed block diagram of an example manner in which the data acquisition unit shown in FIG. 2 may be implemented.

FIG. 3 is a more detailed block diagram of an example manner in which the data acquisition unit 206 shown in FIG. 2 may be implemented. As shown in FIG. 3, the example data acquisition unit 206 includes a frame scanner 300 that receives the compressed digital video information 208, which contains frequency domain image information, and scans the individual images or frames (i.e., I-frames, P-frames, B-frames, etc.) therein to determine, for each image or frame, whether that image or frame contains a sufficient quantity of intra-coded macro blocks for subsequent processing by the remaining functional blocks of the data acquisition unit 206. As described in greater detail in connection with FIG. 4 below, the frame scanner 300 selects frames or images having a relatively high percentage of intra-coded macro blocks to enable the data acquisition unit 206 to generate signature information for those selected images or frames using a relatively small amount of processor time (i.e., processing cost or overhead). As noted above, in contrast to predictive macro blocks (e.g., P-blocks and B-blocks) intra-coded macro blocks may be converted to image information without having to perform complex time consuming calculations involving macro block information from future or subsequent frames or images. Accordingly, by selecting images or frames having a relatively high percentage of intra-coded blocks, the data acquisition unit 206 can generate signatures rapidly and with minimal error for those selected images or frames using only the intra-coded blocks. Ignoring the non-intra-coded blocks does not significantly affect the signature for an image or frame that is composed of a relatively large percentage of intra-coded macro blocks. I-frames are always sufficiently intra-coded and P-frames and B-frames may be sufficiently intra-coded depending on the amount of intra-coded macro blocks that are used to generate these frames.

Frames having a sufficient percentage of intra-coded macro blocks are passed to an intra-coded block extractor 302. The intra-coded block extractor 302 extracts intra-coded macro blocks from a selected frame or image, which may be an I-frame or a predictive frame (e.g., P-frame or B-frame) having a relatively high percentage of intra-coded macro blocks.

A scaled image extractor 304 receives the intra-coded blocks extracted from a selected frame or image and extracts a downscaled image, for example, by extracting DC coefficients (i.e., the upper left corner values) from the intra-coded blocks. As noted above, when conveyed using the MPEG compression process, the macro blocks making up an image or frame are passed through a DCT conversion and quantization that provides spatially compressed frequency domain macro block information. Of course, a downscaled image may be formed using other combinations of frequency coefficients. For example, the DC coefficients and coefficients associated with one or more other frequency components, such as coefficients in the upper left corner of macro blocks, may be extracted. However, in contrast to a case where only DC coefficients are extracted, the scaled image extractor 304 generates the downscaled image by converting the frequency domain blocks to spatial domain pixel information. Thus, in general, the scaled image extractor 304 extracts downscaled images by extracting a subset of the frequency coefficients available in each intra-coded frame provided by the intra-coded block extractor 302, thereby substantially reducing the amount of information that has to be processed to generate signature information, and convert that frequency domain information to spatial domain pixel information. Of course, in the case where only DC coefficients are extracted, the conversion of frequency domain information to spatial domain information is not necessary (and may be eliminated) because the DC coefficients in the frequency domain also correspond to pixel values (i.e., the upper left pixels in blocks) in the spatial domain. In any event, the scaled image extractor 304 extracts the downscaled image information (e.g., the average luminance and chrominance values in the case where DC coefficients are extracted) from the intra-coded macro blocks and passes those downscaled images to a padding remover 306. The number of frequency coefficients used to form the downscaled image may be based on the resolution of the image being downscaled. In particular, high resolution images may be downscaled using only DC coefficients, whereas, lower resolution images may require the extraction of a plurality of frequency coefficients from each frequency domain block to form the downscaled image. In general, the higher the resolution the image being downscaled, the fewer the number of frequency coefficients that are required to form a downscaled image suitable for signature generation purposes.

The padding remover 306 removes coefficients that are associated with padded image or frame areas. As is known, digital video images or frames may be padded (i.e., filled with known video information) to completely fill the display area of a video frame or image. In this manner, border areas of a displayed image or frame for which image information may not exist, can be filled with a consistent color and/or intensity to provide a visually acceptable border. For example, display areas for which image information is not available may be filled with a dark or gray border as opposed to allowing noise or other random video information to be displayed in these display areas. In particular, if a 4:3 aspect ratio image is to be displayed without resizing or zooming on a 16:9 aspect ratio output unit, padding is added to the image so that the left and right sides of the displayed image are flanked by solid colored borders or bands. In any event, such padding is not a part of the original image and is typically a function of the particular encoder.

After padding has been removed from the downscaled image information, the scaled image information is provided to a signature generator 308. As described in greater detail below, the signature generator 308 uses the extracted scaled image information to generate image signatures based on the centers of mass or centroids of the various color and brightness components of an overall image and sub-images or areas defined within that overall image. In this manner, each image can be described by a signature composed of a set of centroid coordinates that is substantially uniquely characteristic of the distribution of color and brightness within that image. Further, a series of such signatures associated with a series or sequence of video frames or images can be used to uniquely represent and/or identify a video program from which the video frames or images were extracted.

Signature information 310, which is a sequence of signatures of frames or images associated with and uniquely representative of a selected video program, is conveyed to, for example, the central processing unit 210 (FIG. 2). As described in greater detail below, the central processing unit 210 is configured to compare the received signature information 310 to reference signature information (e.g., sets of signature sequences representative of known video programs) to determine the identity of a video program currently selected by the demodulator 202 (FIG. 2).

Figure 4:
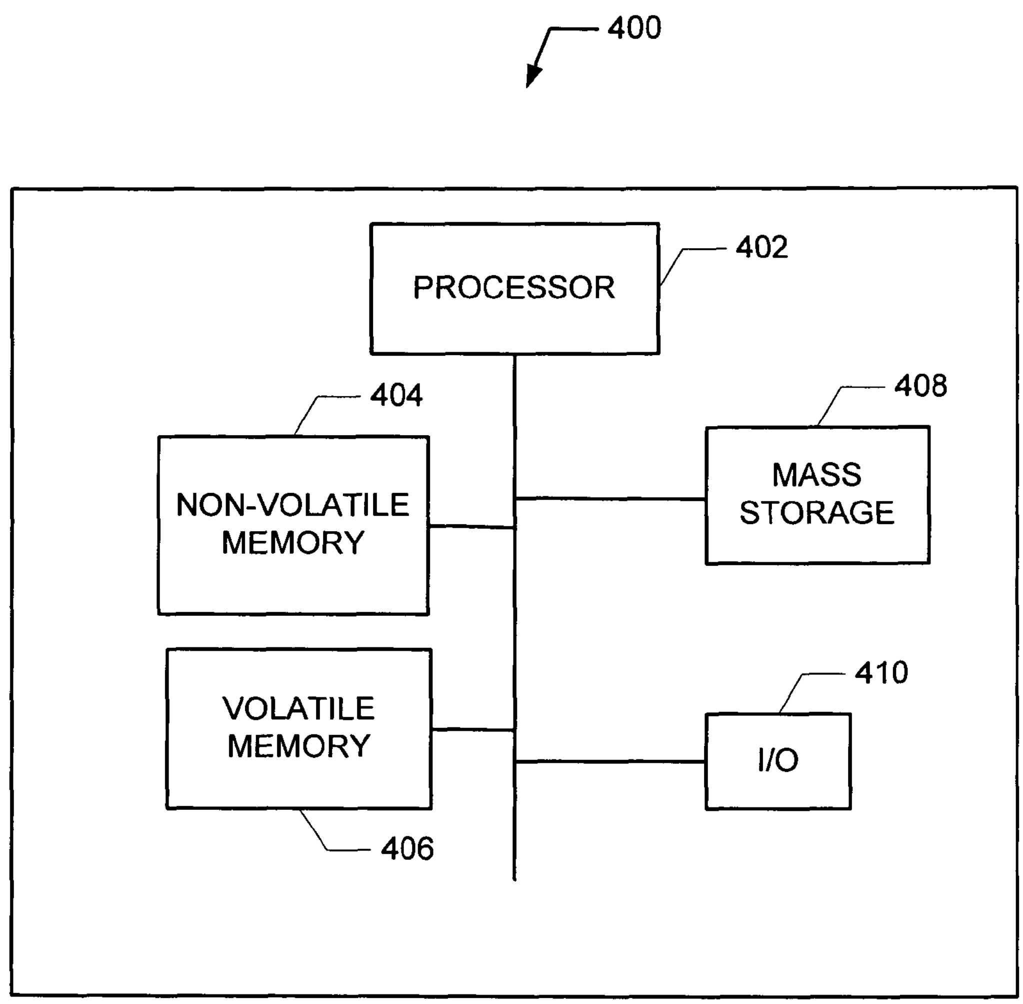
FIG. 4 is an example processor-based system that executes software or instructions stored on a machine readable medium to implement the example data acquisition unit shown in FIG. 2 with the blocks shown in FIG. 3.

FIG. 4 is an example processor-based system 400 that executes software or firmware instructions stored on a machine readable medium to implement the data acquisition unit 206 (FIG. 2). The example processor-based system 400 includes a processor 402, which may be any suitable microprocessor such as, for example, a processor from the Intel Pentium® family of microprocessors. The processor 402 may be communicatively coupled to a non-volatile memory 404 and a volatile memory 406. The non-volatile memory 404 may be implemented using, for example, electrically erasable programmable read only memory (EEPROM), read only memory (ROM), etc. The volatile memory 406 may be implemented using, for example, static random access memory (SRAM), dynamic random access memory (DRAM), etc. The processor 402 may also be coupled to a mass storage device 408, which may be implemented using, for example, a disk drive that stores digital information using a magnetic or optical media.

The processor 402 can retrieve and execute machine readable instructions or software programs that are stored on one or more of the memories 404 and 406 and/or the mass storage device 408 to perform the functions of the data acquisition unit 206 (FIG. 2) and, in particular, the functions of the blocks 300-308 shown in FIG. 3.

The processor 402 is also in communication with an input/output (I/O) unit 410, that enables the system 400 to communicate with, for example, the demodulator 202 (FIG. 2) and/or the central processing unit 210 (FIG. 2). The I/O unit 410 may include circuitry for performing network communication functions (e.g., Ethernet communication functions), phone line communication functions (e.g., modem functions), peripheral device communication functions (e.g., universal serial bus communications, parallel port communications, etc.) to enable the system 400 to communicate with one or more input devices such as, for example, a mouse, keyboard, etc. and/or one or more output devices such as, for example, a video display, a printer, etc.

Figure 5:
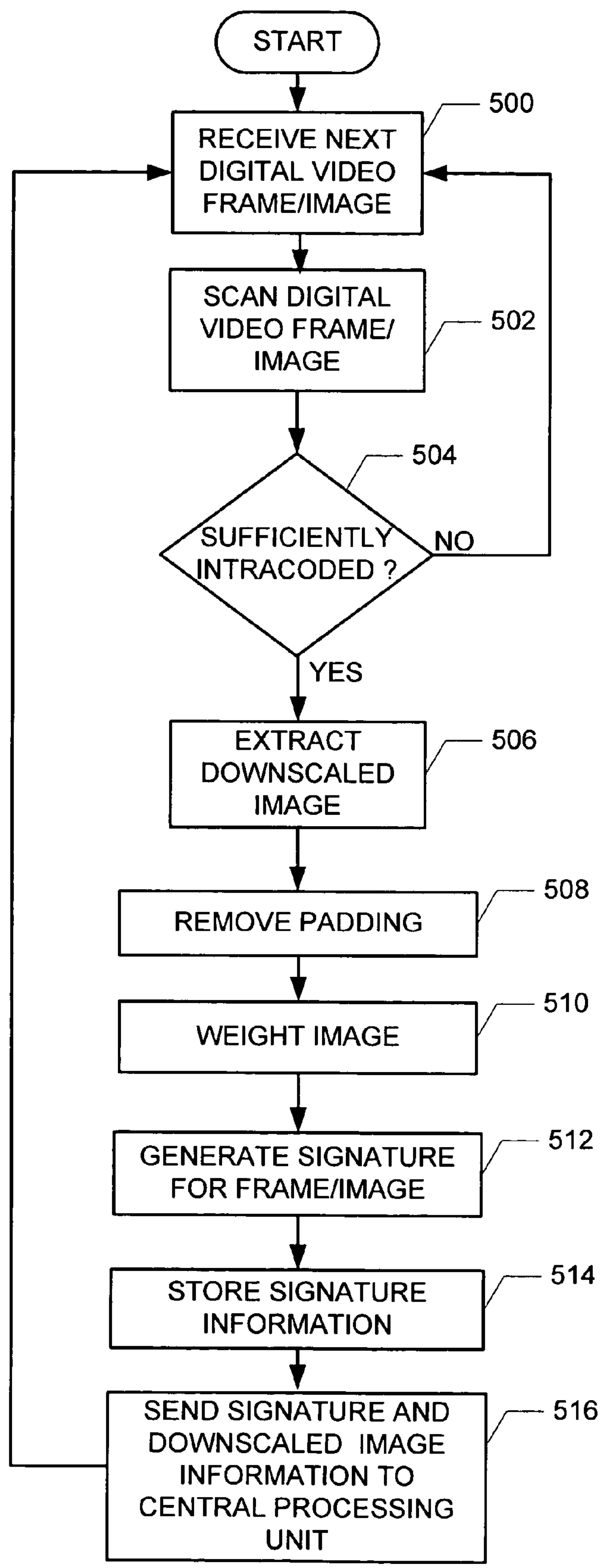
FIG. 5 is flow diagram depicting one manner in which the processor-based system shown in FIG. 4 may be programmed to implement the example data acquisition unit shown in FIG. 3.

FIG. 5 is flow diagram depicting one manner in which the processor-based system 400 shown in FIG. 4 may be programmed to implement the example data acquisition unit 206 (FIG. 2). However, persons of ordinary skill in the art will appreciate that the blocks 300-308 (FIG. 3) of the example data acquisition unit 206 (FIG. 2) may be implemented using any desired combination of hardware and software. For example, the data acquisition unit 206 may include one or more application specific integrated circuits, microprocessors executing machine readable instructions, digital logic components, analog circuitry, etc. configured to operate as blocks 300-308.

The data acquisition unit 206 (FIG. 2) receives a compressed digital video frame or image from the demodulator 202 (block 500). As described above, the compressed video frames or images received by the data acquisition unit 208 are compressed using the well-known MPEG standard. However, any other compression standards or techniques yielding scaled image information (e.g., downscaled images) for the frames or images could be used instead.

The received compressed digital video frame or image is scanned to determine the number or percentage of intra-coded macro blocks of which the frame or image is composed (block 502). The processor 402 then determines if the frame or image includes a sufficiently high percentage of intra-coded macro blocks (block 504). The percentage constituting a sufficient percentage may vary depending on the particular application. For example, if a very low program identification failure rate is acceptable, it may be desirable to generate signatures only for entirely intra-coded frames (I-frames or other frames that contain 100% intra-coded blocks) to maximize the amount of image information that can be used to generate the signature information for the frames or images. On the other hand, if a higher program identification failure rate is acceptable, frames having a lesser percentage of intra-coded blocks may be sufficiently intra-coded.

If a scanned frame is not sufficiently intra-coded (block 504), the processor 402 awaits another frame or image at block 500. On the other hand, if it is determined at block 504 that a scanned image or frame is sufficiently intra-coded, the processor 402 extracts the downscaled image information (e.g., the values of the DC coefficients) from the frequency domain macro blocks making up the image or frame (block 506). The extraction of the downscaled image at block 506 may also include a conversion to spatial domain pixel information in the case where frequency domain coefficients other than just the DC coefficient values are extracted from each frequency domain block.

The processor 402 then removes image information or image areas associated with padding such as, for example, borders or other image portions inserted to enable an image that may not properly fill a display area to be displayed in an unobjectionable manner (block 508). In this manner, the processor 402 can generate signature information for the frame or image in a manner that does not include any video information that is not part of the original image.

The information representative of the image (i.e., the downscaled image containing selected pixel information), from which padding has been removed, may optionally be weighted (block 510). The processor 402 may weight the downscaled image information (e.g., by multiplying each of the pixel values by a number ranging from zero to one) to improve the robustness of the signature generation process. For example, the processor 402 may weight the pixel values associated with the center portions of an image or frame more heavily (e.g., using a multiplier closer to one) than those portions of the image or frame that are closer to the periphery of the image or frame. Weighting the central portion of an image more heavily than the peripheral portions of an image may significantly reduce or eliminate signature generation errors that may otherwise result in the event an image has been cropped at its periphery from its original form. In other words, cropping a portion of an image that is given little, if any, weight during the signature generation process will have little, if any, effect on the accuracy of the signature generation process.

The processor 402 then generates the signature information using the downscaled information from those frames or images that are sufficiently intra-coded (block 512). As described above, certain image areas may be removed prior to the signature generation process (block 512) such as, for example, those areas associated with padding (block 508). In addition, some or all of any remaining areas may be weighted (block 510) prior to the signature generation process (block 512).

Following the generation of a signature for a selected frame or image, the processor 402 may locally store the signature on the mass storage device 408 and/or the volatile memory 406 (block 514). The processor 402 may then send signatures and downscaled image information as it is generated (block 512) and stored (block 514) or, alternatively, periodically in sets or groups of signatures, to the central processing unit 212 (block 516) for matching analysis and program identification. After generating each signature (block 512) and any storing and sending activities (blocks 514 and 516), the processor 402 waits for another image or frame (block 500).

An example signature generation process that may be used to implement block 512 of FIG. 5 is discussed below in connection with FIGS. 6-13. In general, the data acquisition unit 206 (FIG. 2) generates video signatures by calculating the centroids or centers of mass for each of the image color components (e.g., Red, Green, Blue, Yellow, etc.) and brightness components (e.g., Black/White). In particular, each center of mass or centroid is calculated using a downscaled image (e.g., a subset of the frequency coefficients and, thus, a subset of spatial domain pixel values) extracted from each of the frequency domain macro blocks making up an image or frame. Of course, as noted above, certain areas may be eliminated if associated with padding and/or may be weighted to reduce or eliminate the effects of image cropping.

The center of mass calculations or centroid calculations sum the moments of the downscaled image pixel values. In particular, to calculate the horizontal (e.g., x-axis) position within the frame or image for an image component center of mass or centroid, the value for each pixel is multiplied by its column number within its associated image or frame, the individual moments are summed, and the sum is divided by a maximum column moment value to provide a normalized horizontal position for the center of mass or centroid for that image component. Similarly, to calculate the vertical (e.g., y-axis) position within the frame or image for the center of mass or centroid, the value for each pixel is multiplied by its row number within the frame, the individual moments are summed, and the sum is divided by a maximum row moment value to provide a normalized vertical position for the center of mass or centroid for that image component. Mathematically, the normalized horizontal and vertical positions of the centroid for an image component (i.e., a particular color or brightness) "I" can be expressed as a percentage using Equations 1 and 2 below. In Equations 1 and 2, the value "C" is the total number of columns (e.g., the number of pixels per line) within the image or frame for which the signature is being calculated, the value "R" is the total number of rows (e.g., lines), and the values I[r][c] are the values for the pixel at row "r" and column "c" for component "I" (e.g., Red, Green, Blue, Yellow, brightness, etc.).

$$centroid_x = \frac{100\sum_{r=0}^{R-1}\sum_{c=0}^{c=C-1} c * I[r][c]}{C\sum_{r=0}^{R-1}\sum_{c=0}^{C-1} I[r][c]} \quad \text{Equation 1}$$

$$centroid_y = \frac{100\sum_{r=0}^{R-1}\sum_{c=0}^{c=C-1} r * I[r][c]}{R\sum_{r=0}^{R-1}\sum_{c=0}^{C-1} I[r][c]} \quad \text{Equation 2}$$

Of course, as noted above, images or frames may be weighted to eliminate or reduce the effects of cropping and the like. As a result, the values I[r][c] (i.e., the downscaled image pixel values) may be different from the original image or frame. In addition, the above centroid or center of mass calculations are normalized. Using normalized centroid information to generate signatures for images or frames or sequences of signatures for a video sequence can reduce or eliminate the effects of image scaling, shifting, etc.

Figure 6:
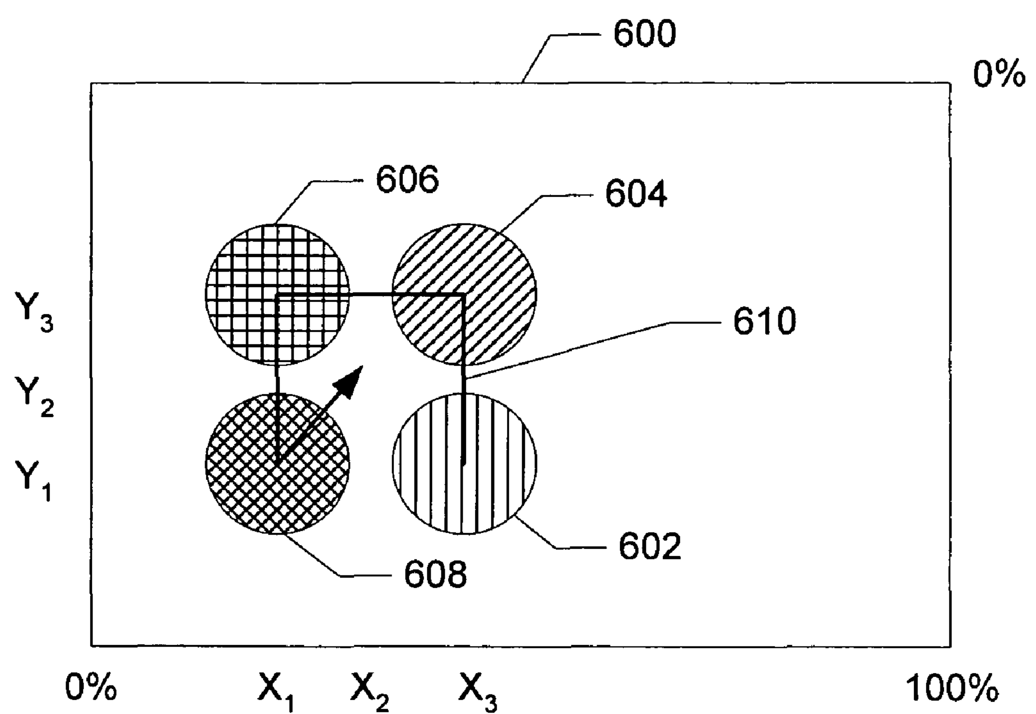
FIG. 6 is an example of an image or frame for which a signature can be generated using a center of mass or centroid calculation.

FIG. 6 is an example of an image or frame 600 for which a signature can be calculated using the method described above in connection with Equations 1 and 2. To clearly illustrate the manner in which signature information is generated using Equations 1 and 2, the image or frame 600 includes four circles 602, 604, 606 and 608, each of which is a pure color within a particular color model. For example, the circles 602-608 may be red, green, blue and yellow, respectively. In addition, to keep the example simple, the colored circles 602-608 are of equal and uniform brightness.

Using Equations 1 and 2 above to generate the normalized horizontal and vertical coordinates for the centroids or centers of mass for each of the colors and brightness components of the image 600 results in the set of coordinate pairs $(X_1, Y_1)$, $(X_1, Y_3)$, $(X_2, Y_2)$, $(X_3, Y_1)$, and $(X_3, Y_3)$. The pair $(X_1, Y_1)$ is the centroid of the color component associated with the circle 608, $(X_1, Y_3)$ is the centroid of the color component associated with the circle 606, $(X_2, Y_2)$ is the centroid of the brightness associated with the image 600, $(X_3, Y_1)$ is the centroid of the color component associated with the circle 602, and $(X_3, Y_3)$ is centroid of the color component associated with the circle 604.

The set of normalized coordinate pairs for the centroids or centers of mass of the various color and brightness components that combine to compose the image or frame 600 are substantially uniquely representative of the image 600. For instance, moving only the circle 602 horizontally toward the right of the image 600 will significantly affect the horizontal component of the centroid for the circle 602 (e.g., the value $X_3$ will move accordingly).

The set of normalized coordinate pairs for the image 600 can be used in several manners to define a signature for the image 600. For example, the signature for the image 600 may be defined as a collection or set of the centroid coordinate pairs for each component color and/or brightness making up an image. In particular, a signature "S" for an image could be defined as S=($Red_x$, $Red_y$, $Green_x$, $Green_y$, $Blue_x$, $Blue_y$, $Yellow_x$, $Yellow_y$, $Brightness_x$, $Brightness_y$), where $Red_x$ is the horizontal position of the centroid for the color red, $Red_y$ is the vertical position of the centroid for the color red, etc. Accordingly, the signature for the example image 600 calculated using such a collection or set is $S=(X_3, Y_1, X_3, Y_3, X_1, Y_3, X_1, Y_1, X_2, Y_2)$.

Alternatively, a signature based on the normalized coordinates of the color and brightness image components can be formed using relative position information between two or more of the image components. For example, a signature can be formed using vectors or relative movement or location information for several image components based on the absolute normalized coordinates for one image component. In the case of the example image 600, if the absolute coordinates for the centroid of the color component red are used (i.e., $X_3, Y_1$), the positions of the remaining components (i.e., green, blue, yellow and brightness) are described relative to red and one another and follow a path 610 within the image 600. Thus, the position of the centroid for the green component can be defined relative to the red component, the position of the centroid for the blue component relative to the green component, the position of the centroid for the yellow component relative to the blue component and the position of the brightness component relative to the yellow component. Such a signature may be expressed mathematically as shown in Equation 3 below.

$$S=(\Delta X_g, \Delta Y_g, \Delta X_b, \Delta Y_b, \Delta X_y, \Delta Y_y, \Delta X_{bght}, \Delta Y_{bght}) \quad \text{Equation 3}$$

The delta X and Y values represent horizontal and vertical displacements from the horizontal and vertical positions of the preceding centroid within the set of centroid positions making up the signature "S." Thus, the values $\Delta X_g$ and $\Delta Y_g$ represent the difference between the coordinates for the centroid of the green component and the red component (i.e., $\Delta X_g = X_3 - X_3 = 0$ and $\Delta Y_g = Y_3 - Y_1$), the values $\Delta X_b$ and $\Delta Y_b$ represent the difference between the coordinates for the centroid of the blue component and the green component (i.e., $\Delta X_b = X_1 - X_3$ and $\Delta Y_b = Y_3 - Y_3 = 0$), etc.

As shown in Equation 3 above, the absolute coordinates for the position of the centroid of the red component are not included to provide a signature that is not sensitive to shifting or movement of an entire image within the frame 600. For example, when using a signature generation technique based on relative centroid positions (such as that provided by Equation 3 above), a displacement of all four of the circles 602-608 by the same horizontal and vertical distances within the frame 600 will not affect the signature generated (i.e., the relative centroid coordinates or positions will not change). Alternatively or additionally, the positions of one or more of the signature components signature may be generated based on the position of the image component centroid with respect to a predetermined or fixed reference point.

While the example image 600 of FIG. 6 is described as being based on a color model having red, green, blue, yellow and brightness components, other color models and, thus, image components could be used instead. For example, many well-known color models including, for example, RGB, HIS, YUV, YCrCb, CIELAB and the like may be used in conjunction with the example methods and apparatus disclosed herein.

Further, image information may be received by the data acquisition unit 206 (FIG. 2) in a form based on one color model and converted to another color model to facilitate and/or improve the signature generation process. For example, the data acquisition unit 206 may receive MPEG image information from the demodulator 202. As described above, MPEG images or frames are formed using a YUV or YCrCb color model. During signature generation (block 512 of FIG. 5), the data acquisition unit 206 may convert the luminance and chrominance information provided by the YCrCb or YUV models to provide color information for red, green, blue, yellow and brightness components. Because the relationships between the different color models are well known, a detailed description of such a conversion process is not provided herein.

While the above examples and, particularly, Equations 1 and 2, depict the use of normalized centroid coordinates, non-normalized centroid information may be used as well. However, as described below, the use of non-normalized centroid information may result in increased sensitivity to image scaling and the like, which may result in a higher probability of failing to identify or falsely identifying an image or sequence of images (e.g., a video program).

For purposes of clarity, the distribution of components (e.g., colors, brightness, etc.) within the frame or image 600 is greatly simplified. Namely, the color components composing the frame 600 are represented as non-overlapping, symmetrically distributed circles. Of course, most images or frames making up a video program are composed of a significantly more complex distribution of color and brightness components than the simplified case shown in FIG. 6.

Figure 7:
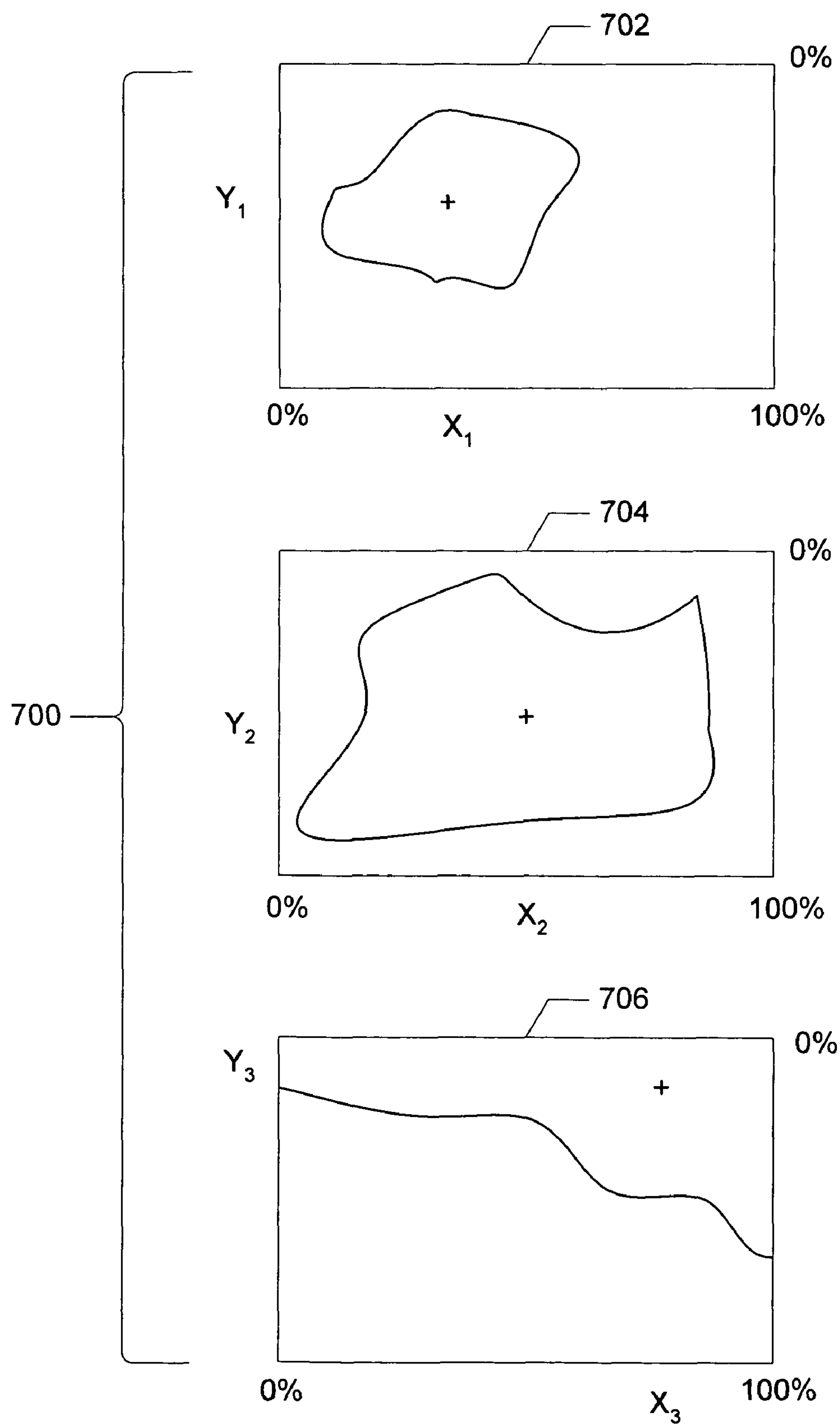
FIG. 7 depicts an example image or frame in which image components are distributed in a non-uniform manner.

FIG. 7 depicts an example image or frame 700 in which three image components (e.g., three colors of a color model) are distributed in a more complex non-uniform manner. For clarity, the image 700 is shown as three component layers 702, 704 and 706 in which each image component is distributed in a non-uniform manner. For instance, the layer 702 may be a red layer, the layer 704 may be a green layer and the layer 706 may be a blue layer having respective centroids or centers of mass $(X_1, Y_1)$, $(X_2, Y_2)$ and $(X_3, Y_3)$. One having ordinary skill in the art will readily appreciate that the signature generation technique described above in connection with FIG. 6 and Equations 1, 2 and 3 may similarly be applied to images having more complex component distributions such as the image 700 of FIG. 7.

Figure 8:
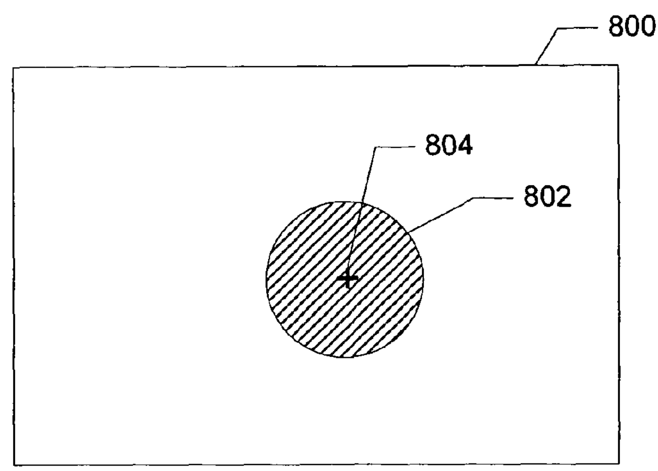
FIG. 8 depicts an example image in which a centroid is located within a shape boundary.
Figure 9:
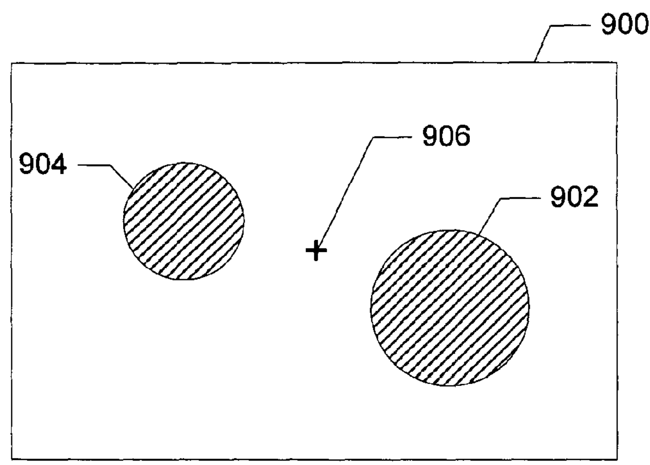
FIGS. 9 and 10 depict example images or frames in which centroids are not located within the boundary of the shapes therein.
Figure 10:
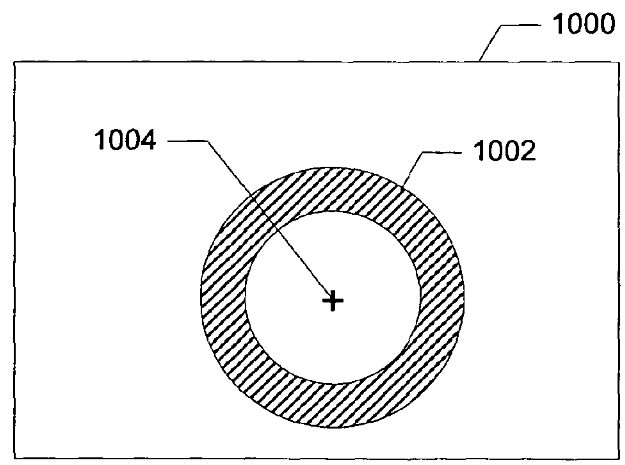

While the signature generation technique described in connection with FIG. 6 above provides substantially unique sets of normalized component centroids (i.e., horizontal and vertical coordinate pairs), certain component distributions may result in significantly reduced signature uniqueness. For example, FIG. 8 depicts a frame or image 800 having a circle 802 of a pure color component (e.g., red, green, blue, etc.) The circle 802 has a centroid 804 located at the "+" at the center of the circle 802. FIG. 9 depicts an example frame or image 900 having two circles 902 and 904 of a pure color component the same as that composing the circle 802 of the image 800. A centroid 906 for this color component of the image 900 is located at the "+." FIG. 10 depicts another example frame or image 1000 having a ring-shaped object 1002 composed of the same color component as that composing the circles 802, 902 and 904 of FIGS. 8 and 9. A centroid 1004 for this color component of the image 1000 is identically positioned within the image 1000 as the centroids 804 and 906 are positioned within the images 800 and 900. Thus, in this instance, the centroids for a particular color component for three substantially different distributions of that color component are all identically positioned within their respective images or frames and, thus, cannot be used to uniquely distinguish between the images 800, 900 and 1000.

Figure 11:
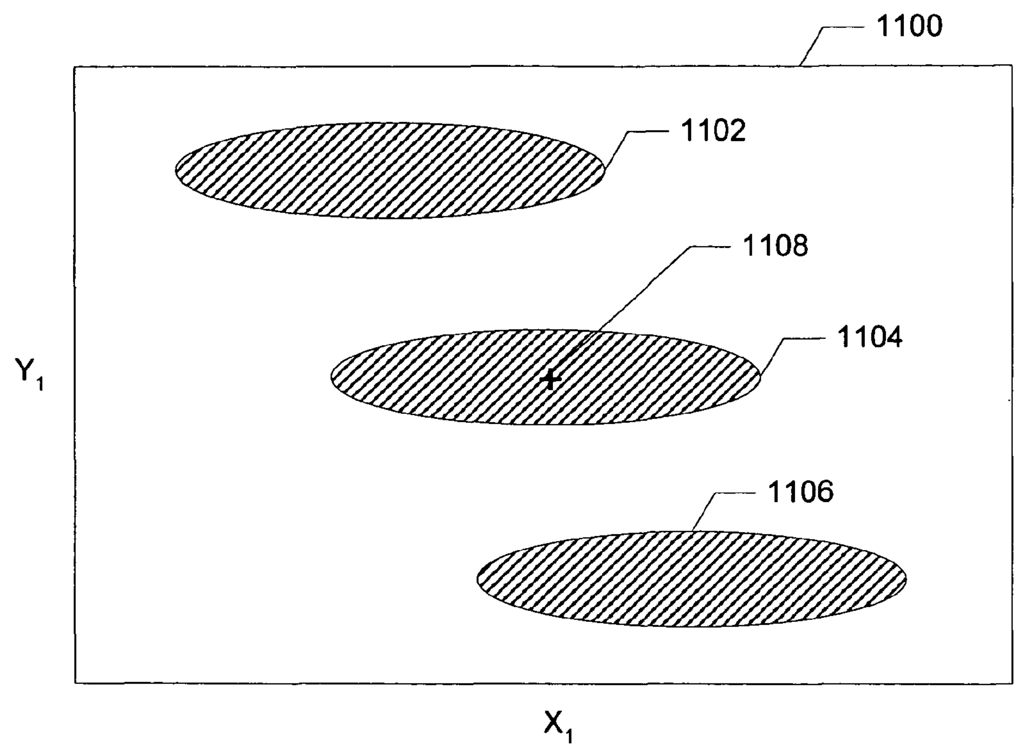
FIGS. 11 and 12 are example images or frames that contain relatively symmetric distributions of a particular image component.
Figure 12:
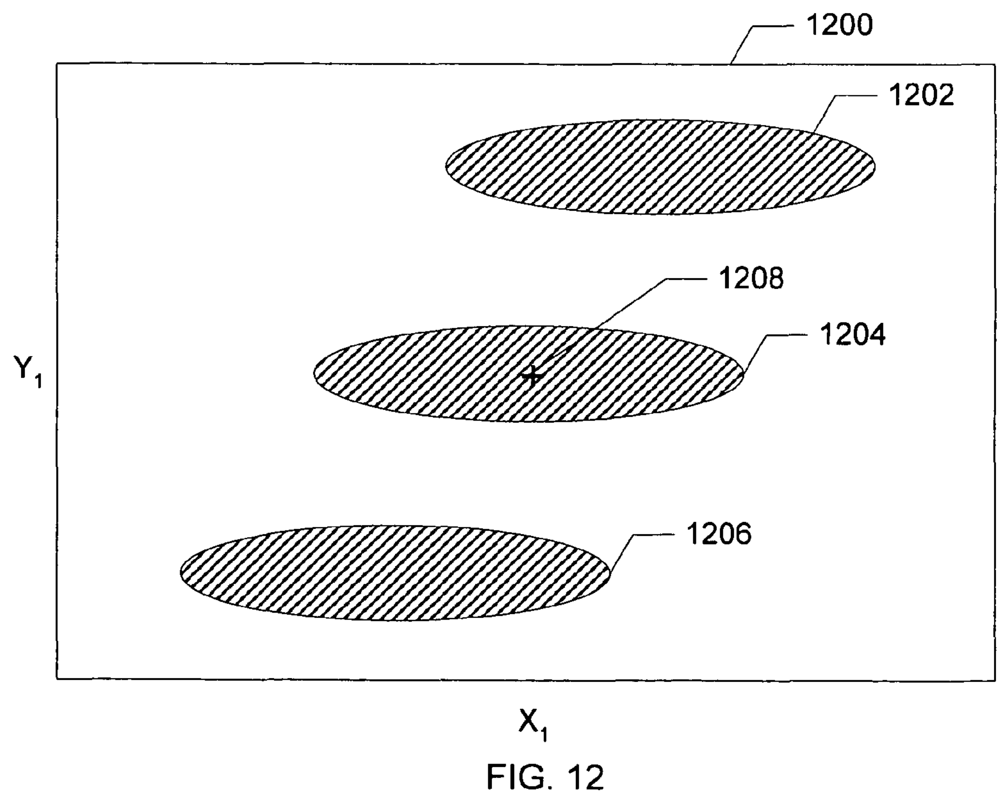

Another difficulty that can arise when attempting to generate unique signatures for video images occurs with images having substantially symmetric component distributions. FIGS. 11 and 12 are example frames or images 1100 and 1200 that contain relatively symmetric distributions of a particular component. In particular, the frame 1100 contains three identical elliptical shapes 1102, 1104 and 1106, each of which is composed of a single component (e.g., a single color component). Using Equations 1 and 2 above, the center of mass or centroid of the component distribution shown in FIG. 11 is located at $(X_1, Y_1)$, which is designated within the image 1100 using a "+" sign at reference numeral 1108.

FIG. 12 also contains three elliptical shapes 1202, 1204 and 1206 that are composed of the same component and are of the same shape and size as the shapes 1102, 1104 and 1106 of FIG. 11. Although the shapes 1202, 1204 and 1206 are distributed within the image or frame 1200 in a substantially different manner than the shapes 1102, 1104 and 1106 are distributed within the frame 1100, using Equations 1 and 2 above to generate a centroid for the component distribution within the frame 1200 yields a centroid location 1208 that is identical to the centroid location 1108 of the component distribution of FIG. 11 (i.e., $X_1, Y_1$).

Those having ordinary skill in the art will, of course, recognize that in practice, most images (e.g., color images) include more than one component (e.g., red, green, blue, etc.). As a result, even if the centroid for one of the image components fails to be uniquely associated with that image, the remaining components may, nevertheless, provide a set of centroids that is substantially unique for purposes of identifying that image. However, signatures composed of fewer substantially unique component centroids (i.e., the set of centroid locations is less unique) can significantly decrease the reliability of image identifications (e.g., misidentifications may occur) based on those sets of centroids.

As described in greater detail in connection with FIG. 13 below, a signature for a frame or image can be made more unique by sub-dividing the image or frame into a plurality or regions or areas, calculating the component centroids for these sub-divided regions or areas and forming a signature for the frame or image including component centroids for the overall image and the component centroids for the sub-divided regions or areas. Thus, a signature generated in this manner is less sensitive to the aforementioned problems discussed in connection with FIGS. 8-12 above.

Figure 13:
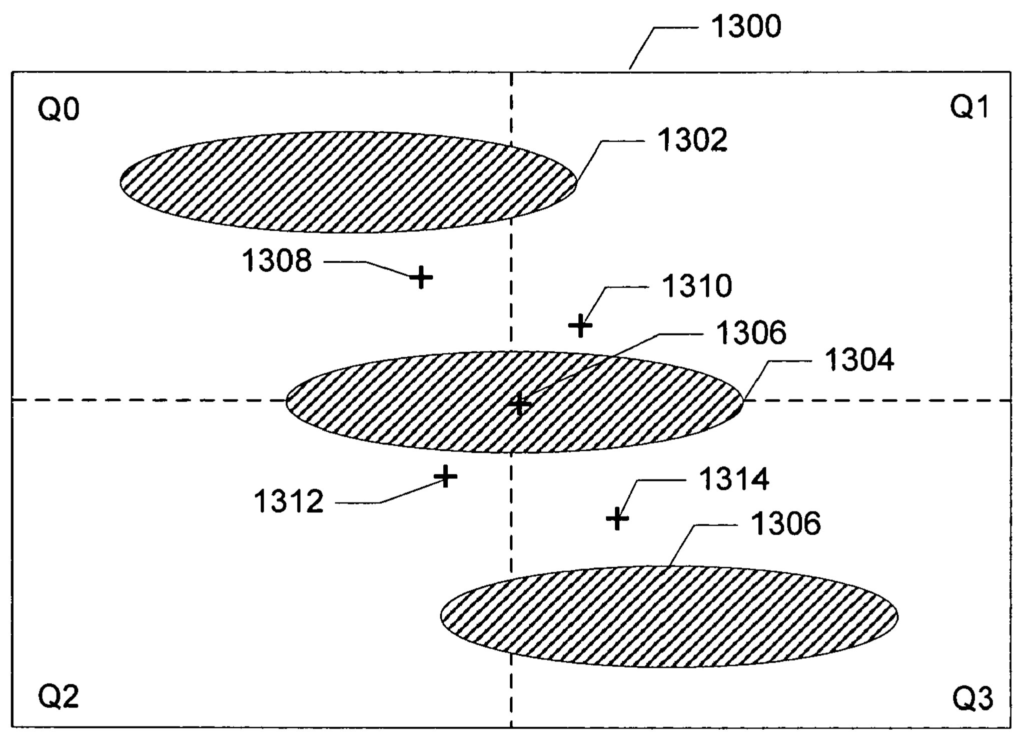
FIG. 13 depicts an example frame or image that contains three identical elliptical shapes composed of the same image component.

FIG. 13 depicts an example frame or image 1300 that contains three identical elliptical shapes 1302, 1304 and 1306, all of which are composed of the same component (e.g., a single color). As depicted by the dashed lines, the image 1300 has been sub-divided into four quadrants labeled Q0, Q1, Q2 and Q4. The centroid for the overall image 1300 is located at the "+" designated by the reference numeral 1306 and the centroids for the quadrants Q0, Q1, Q2 and Q3 are designated by the "+" signs designated by respective reference numerals 1308, 1310, 1312 and 1314, respectively.

Thus, when an image is partitioned or sub-divided into four sub-images, regions or areas, each image component (e.g., a color or brightness component) may be represented using five centroids (i.e., five horizontal and vertical coordinate pairs or ten values), one of which corresponds to the overall image and the remaining four of which correspond to the four sub-images or regions. For an image containing red, green, blue, yellow and brightness components, set containing a total of twenty-five centroids (i.e., twenty five horizontal and vertical coordinate pairs or fifty values) may be used to form a signature for the image or frame. An example of such a signature can be represented as depicted in Table 4 below.

TABLE 4

| | RED | GREEN | BLUE | YELLOW | BRIGHTNESS |
|---|---|---|---|---|---|
| OVERALL IMAGE | $X_1, Y_1$ | $X_2, Y_2$ | $X_3, Y_3$ | $X_4, Y_4$ | $X_5, Y_5$ |
| Q0 | $X_6, Y_6$ | $X_7, Y_7$ | $X_8, Y_8$ | $X_9, Y_9$ | $X_{10}, Y_{10}$ |
| Q1 | $X_{11}, Y_{11}$ | $X_{12}, Y_{12}$ | $X_{13}, Y_{13}$ | $X_{14}, Y_{14}$ | $X_{15}, Y_{15}$ |
| Q2 | $X_{16}, Y_{16}$ | $X_{17}, Y_{17}$ | $X_{18}, Y_{18}$ | $X_{19}, Y_{19}$ | $X_{20}, Y_{20}$ |
| Q3 | $X_{21}, Y_{21}$ | $X_{22}, Y_{22}$ | $X_{23}, Y_{23}$ | $X_{24}, Y_{24}$ | $X_{25}, Y_{25}$ |

Of course, more or fewer image components may be used if desired. Additionally, fewer or more partitions, sub-images or regions or areas may be used. For example, sub-regions may be further sub-divided in a recursive manner to achieve any desired level of signature uniqueness. In other words, a greater number of sub-images or sub-divided areas may be defined within an image or frame to generate a signature having a greater amount of distinguishing information. Further, the sub-image areas or regions do not have to be identically shaped and sized. For example, relatively smaller subdivisions or sub-images may be used within the central region of an overall image and relatively larger sub-divisions may be used within the peripheral regions of an image. Still further, while the signature generation example given in connection with FIG. 13 uses normalized non-relative centroid coordinates or locations, relative centroid locations as discussed above may be used instead.

The above-described signature generation techniques employing sub-images or regions within images or frames to increase signature uniqueness can be used to improve the reliability of an image identification process, particularly in cases where there is a significant amount of symmetry among images being identified. However, there are still further problems that may be encountered for certain types of images or frames. For example, images having a relatively constant distribution of components across the entire image tend to produce centroids that are located within the center of the frame or image, regardless of the color, hue and/or brightness of the image.

Centroids calculated for frames or images having a constant value that is substantially greater than zero will all be relatively stable and centered within the images. Thus, an entirely medium gray image and an entirely dark gray image will both result in centroids that are centered within the image, thereby making it impossible to distinguish these two images on the basis of their image component centroids. In general, these types of images contain little, if any, information and may, for example, be perceived as blank images.

For frames or images having a constant value that is near to zero, video signal noise may cause the centroid to vary from frame to frame, even if the images are perceptually identical (e.g., all the images are blank). In such a case, calculating the centroid based on Equations 1 and 2 above yields unstable results (i.e., signature values) that may significantly reduce the reliability with which the video programming associated with these images can be identified.

An alternative signature generation technique may be employed for the images or frames that contain relatively constant information (e.g., the distribution of one or more image components is relatively uniform within the frames or images), such as those described above. In particular, if during execution of the example method shown in FIG. 5 it is determined that the majority of spatial domain values (e.g., the downscaled image) are all about the same value, block 512 may generate the signature for the frame or image being processed using such an alternative signature generation technique. One such alternative signature generation technique may be based on calculating component coordinates using Equation 4 below.

$$X=-100 \quad \text{Equation 4}$$

$$Y=100*K/K_{max} \quad \text{Equation 5}$$

The values X and Y are the representative horizontal and vertical coordinates of a substituted or pseudo-centroid, the value "K" is an estimated constant value such as, for example, a trend or average pixel value(s) for a component of the image being processed, and the value $K_{max}$ is a maximum possible average pixel value for the component. As noted above, Equation 4 does not provide an actual geometric centroid but, rather, a pair of coordinates that can be used to serve the function of a substantially unique coordinate pair for a relatively blank or uniform image. Thus, using Equation 4 to calculate representative coordinates for one image entirely filled with medium gray and another image entirely filled with dark gray will yield different pseudo-centroids or coordinate pairs that enable substantially unique signatures for these images to be formed.

Yet another difficulty in generating substantially unique signatures occurs for images that are composed primarily of dark foreground (e.g., dark text) on a substantially white background. In these cases, the relatively high (and constant) background values associated with the white portions of the image have a much greater effect on the center of mass or centroid than the relatively low foreground values associated with the darker foreground.

As a result, signatures formed using centroids for these kinds of images will typically not be sufficiently unique to identify differences between, for example, an image containing one text block in a given location and another image containing a different text block in the same or a different location. In these cases, the image values may be inverted (i.e., the image may be inverted so that the foreground (e.g., textual information) is relatively light and the background is relatively dark) so that the foreground has a much more significant effect on the centroid of the image. The pixel values associated with the inverted image are then used to generate the centroid(s) and, thus, the signature for the image(s). However, when using Equations 1 and 2 described above to calculated the centroid values, the centroid values may be negated (i.e., multiplied by −1) to indicated that the centroid values correspond to an inverted image.

As discussed above, the data acquisition unit 206 (FIG. 2) receives video frames or images (e.g., compressed video or MPEG frames) from the demodulator 202 (FIG. 2) and generates signatures and downscaled images for some or all of these received frames or images using, for example, the methods described above. As described in greater detail in connection with FIGS. 14 and 15 below, the central processing unit 210 (FIG. 2) is configured to compare sequences of signatures received from the data acquisition unit 206 (FIG. 2) to reference sequences of signatures associated with known video programs (e.g., television commercials, television shows, etc.) to identify one or more selected programs and forward the unidentified video clip to the central facility 216.

Initially, the central processing unit 210 (FIG. 2) receives signature information from the data acquisition unit 206 (FIG. 2) (block 1400). The central processing unit 210 then determines whether the received signature information is the start or beginning of a sequence (block 1402). If the received signature information is the start of a sequence at block 1402, the central processing unit 210 selects one or more reference signature sequences from a database or library of signature sequences (block 1404), which may be stored within the memory or mass storage device 214 (FIG. 2), and appends the selected signature sequences to a dynamic accumulation table or intermediate results table. On the other hand, if the central processing unit 210 determines at block 1402 that the received signature information is not the start of a sequence, then control is passed to block 1406.

The reference signatures accumulated at block 1404 (candidate signature sequences) are to be compared to the sequence of signatures currently being received (suspect signature sequence) to determine if an exact or substantial match exists and, if such a match exists, identify the video program associated with the suspect signature sequence. In general, signature sequences may be represented as $[S_A][S_B][S_C][S_D]$ . . . , where $S_A$ is a first signature (e.g., a set of image component centroids generated as set forth above) for a frame or image, $S_B$ is another signature (e.g., another set of image component centroids) associated with a subsequent frame or image, etc. Accordingly, one useful manner of selecting candidate or reference signature sequences (block 1404) in a case where the initial signature received at block 1400 is $S_A$ is to select all signature sequences from the database or library of known signature sequences that include the signature $S_A$ within a predetermined number of signatures from the beginning of the sequence. For example, the signature sequences listed below in Table 2, if in the database or library, may be selected at block 1404 and appended to the accumulation or intermediate results table. As can be recognized from Table 2 below, the selected signature sequences do not necessarily begin with the signature $S_A$ but, instead, include the signature $S_A$. From the example group of selected signature sequences shown in Table 2, only signature sequences including the signature $S_A$ within the first three signatures may have, for example, been selected.

TABLE 2

| Sequence # | REFERENCE SIGNATURE SEQUENCES |
|---|---|
| 1 | $[S_A][S_F][S_K][S_N][S_Z]$ |
| 2 | $[S_A][S_H][S_L][S_N][S_V]$ |
| 3 | $[S_A][S_F][S_K][S_P][S_Q]$ |
| 4 | $[S_A][S_F][S_G][S_P][S_J]$ |
| 5 | $[S_X][S_A][S_F][S_G][S_N]$ |
| 6 | $[S_X][S_Y][S_A][S_G][S_N]$ |

Following the comparison at block 1406, the central processing unit 210 updates match results for each of the reference signature sequences (block 1408) in the accumulation or intermediate results table. In general, the match results track, for each reference sequence of signatures, if the individual signatures within a sequence of signatures generated by the data acquisition unit 206 (FIG. 2) match corresponding signatures within the reference sequences of signatures. Thus, the match results can be represented within a table in which each row of the table corresponds to a different reference signature sequence and each column of the table corresponds to a relative temporal position within the sequence. Table 3 below is an example table that represents the match results after having received the signatures $S_A$ and $S_F$. The value "1" indicates a match occurred at block 1406, the value "0" indicates a match did not occur and "X" indicates a position within the sequence that has not yet been tested (i.e., compared to a signature received from the data acquisition unit 206).

TABLE 3

| Sequence # | MATCH RESULTS | | | | |
|---|---|---|---|---|---|
| 1 | 1 | 1 | X | X | X |
| 2 | 1 | 0 | X | X | X |
| 3 | 1 | 1 | X | X | X |
| 4 | 1 | 1 | X | X | X |
| 5 | 0 | 1 | 1 | X | X |
| 6 | 0 | 0 | 1 | 0 | 0 |

The processing unit 210 then eliminates non-matching reference signature sequence from the accumulation or intermediate results table (e.g., from Table 2). For example, sequence number two may be eliminated for having at least one non-matching signature. However, in some cases it may be desirable to only eliminate sequences having two non-matching signatures or a greater number of non-matching signatures. For this example, only sequences having three or more non-matching signatures are eliminated at block 1410. As a result, only signature sequence six is eliminated following the receipt and processing of the second signature $S_F$.

Continuing with the above example, following the receipt of the signature $S_F$, each of the remaining signature sequences has at least two untested positions. As a result, the processing unit 210 will loop through blocks 1400-1420 at least two additional times. If the signatures $S_G$ and $S_N$ are received as third and fourth signatures, respectively, no additional comparisons will be required at block 1406 after receiving the signature $S_N$ (i.e., there are no untested sequence positions at that point). Thus, the state of the match results for the above example is as depicted in Table 4 below.

TABLE 4

| Sequence # | MATCH RESULTS | | | | |
|---|---|---|---|---|---|
| 1 | 1 | 1 | 0 | 0 | 0 |
| 2 | 1 | 0 | 0 | 0 | 0 |
| 3 | 1 | 1 | 0 | 0 | 0 |
| 4 | 1 | 1 | 1 | 0 | 0 |
| 5 | 0 | 1 | 1 | 1 | 1 |
| 6 | 0 | 0 | 1 | 0 | 0 |

As can be seen from Table 4 above, signature sequences one, two, three and six have been eliminated following the receipt of the signature $S_N$ because these sequences contained at least three non-matching signatures upon receipt of the signature $S_N$.

The central processing unit 210 examines the match results to determine if there is a matching sequence (block 1414). In the case of the above example, signature sequence five is an identical match and, thus, is a matching sequence. However, in some cases the processing unit 210 may consider a substantial match (i.e., a non-identical match) sufficient. For example, the processing unit 210 may consider three out of four matches for a signature sequence to be a matching sequence. Additionally or alternatively, the central processing unit 210 may consider the reference signature sequence having the greatest number of matching signatures to be a matching sequence, regardless of the percentage of matching signatures. Still further, if two or more reference signature sequences result in the same percentage or number of matches, the central processing unit 210 may, based on historical information, identify the matching reference sequence of signatures as that sequence that occurs most frequently (i.e., the most probable sequence of signatures). More generally, the number or percentage of matching signatures required to satisfy a matching condition depends on what level of inaccurate video program identification is acceptable for a particular application. In other words, if a relatively low level of inaccurate video program identification is acceptable, then a lower percentage or number of matching signatures may be acceptable to satisfy a match condition. On the other hand, if a relatively high level of inaccurate video program identification is acceptable, then a higher percentage or number of matching signatures may be acceptable to satisfy a match condition.

In any event, if the central processing unit 210 determines that a signature sequence match has been found at block 1414, the central processing unit 210 then identifies the video sequence or program associated with the matching reference signature sequence (block 1416). Any desired data structures and/or database search techniques may be used. For example, once a matching sequence of signatures has been identified, the sequence number or identifier associated with the matching sequence of signatures may be used to access (e.g., via an indexing or lookup method) textual information associated with the audio and/or video program corresponding to that identifier or sequence number. Alternatively, a set of tables organized in a linked tree-like data structure may be used. In particular, each of the tables may be indexed using centroids or coordinate pairs (e.g., horizontal and vertical coordinates). In this manner, a first coordinate pair or centroid associated with a signature is used to index to a link to a subsequent table. The next coordinate pair of the signature is then used to index within the subsequent table to another table. This process continues until all coordinate pairs associated with all of the signatures within a signature sequence have been exhausted at a final table. The last coordinate pair is then used to index to textual information (e.g., in the form of metadata) describing the video program associated with the sequence of signatures information (i.e., sequence of centroids or coordinate pairs used to index through the linked tables). A searchable tree-like data structure such as that described above provides a relatively short search time. In the case where the video programs being identified are television commercials a relatively faster search technique may be highly advantageous because a relatively large number of commercials (e.g., 1,000,000 or more) may be contained within the database to be searched.

If, on the other hand, at block 1414 the processing unit 210 determines that a matching sequence cannot be found, the processing unit 210 determines if a manual identification is required or desired (block 1417). If, at block 1414, a manual identification is required, a human operator may intervene and manually identify the video program (block 1418). For example, the human operator may view the video sequence to determine the identity of the sequence. If the video program identified by the human operator at block 1418 was previously not contained within the database, the sequence may be added to the database.

On the other hand, if the video program was already stored in the database but was associated with a different sequence, the operator may update the reference information to include possible signature sequences for that video program. In some cases, multiple signature sequences may be needed to represent a single video program that can be conveyed to the demodulator 202 using somewhat different encoding at a broadcast station (not shown). An efficient manner to store and search multiple signature sequences for a single video program is to represent the sequence of signature positions for which multiple signatures are possible using a logical OR data structure. For example, a reference sequence of signatures may be expressed as $[S_A][S_B|S_N][S_G][S_F|S_K]$, where the "|" means OR. Thus, continuing the example, the signature sequences $[S_A][S_B][S_G][S_F]$, $[S_A][S_N][S_G][S_K]$, $[S_A][S_B][S_G][S_K]$ and $[S_A][S_N][S_G][S_F]$ are all matches to the reference sequence of signatures and, thus, are all associated with the same video program. Storing reference signature information using the above-described OR-based data structure can significantly reduce the amount of memory needed to maintain a library of reference signatures and can substantially reduce the amount of time needed to search such a library of reference signatures for matching signatures. The activities associated with blocks 1418 and 1420 may be performed at, for example, the central facility 216 (FIG. 2).

Figure 14:
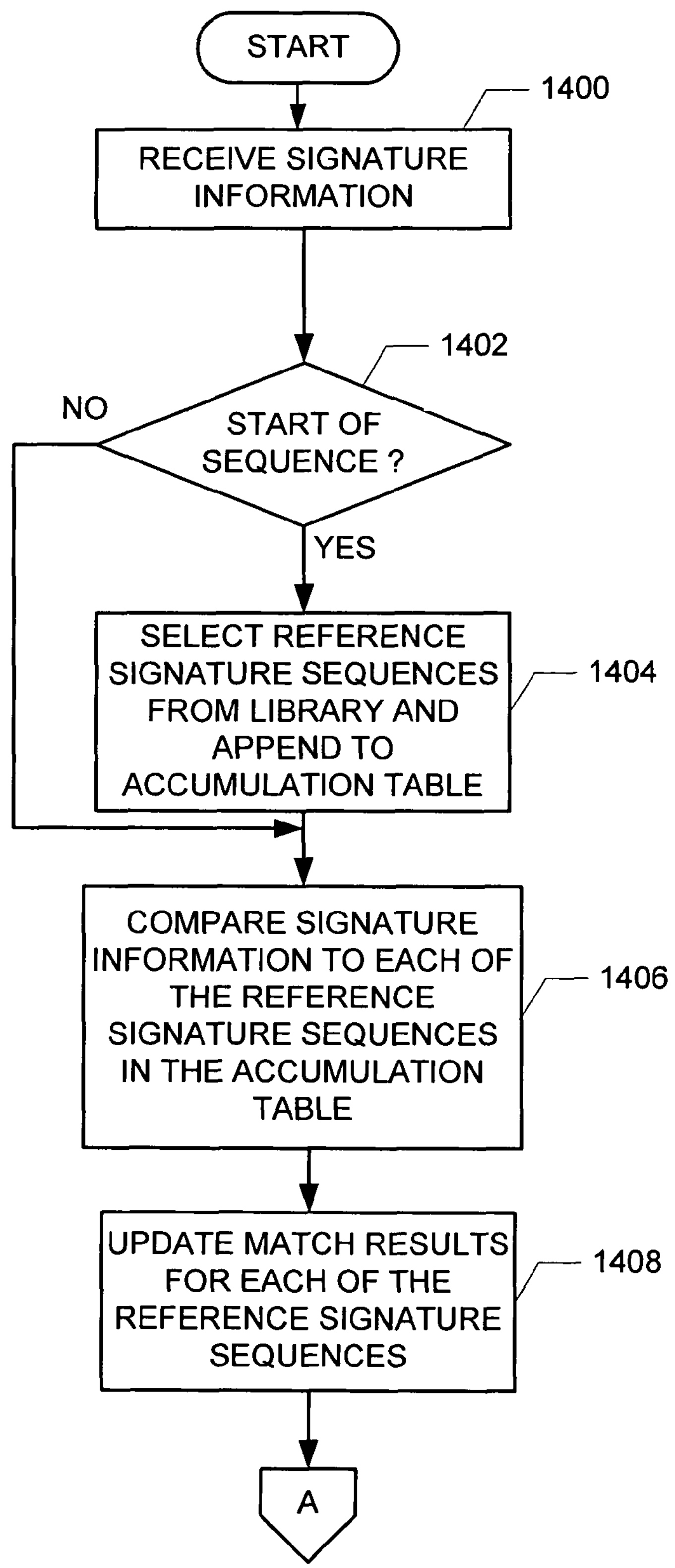
FIGS. 14 and 15 depict an example method that may be implemented by the system shown in FIG. 2 to identify video programs.
Figure 15:
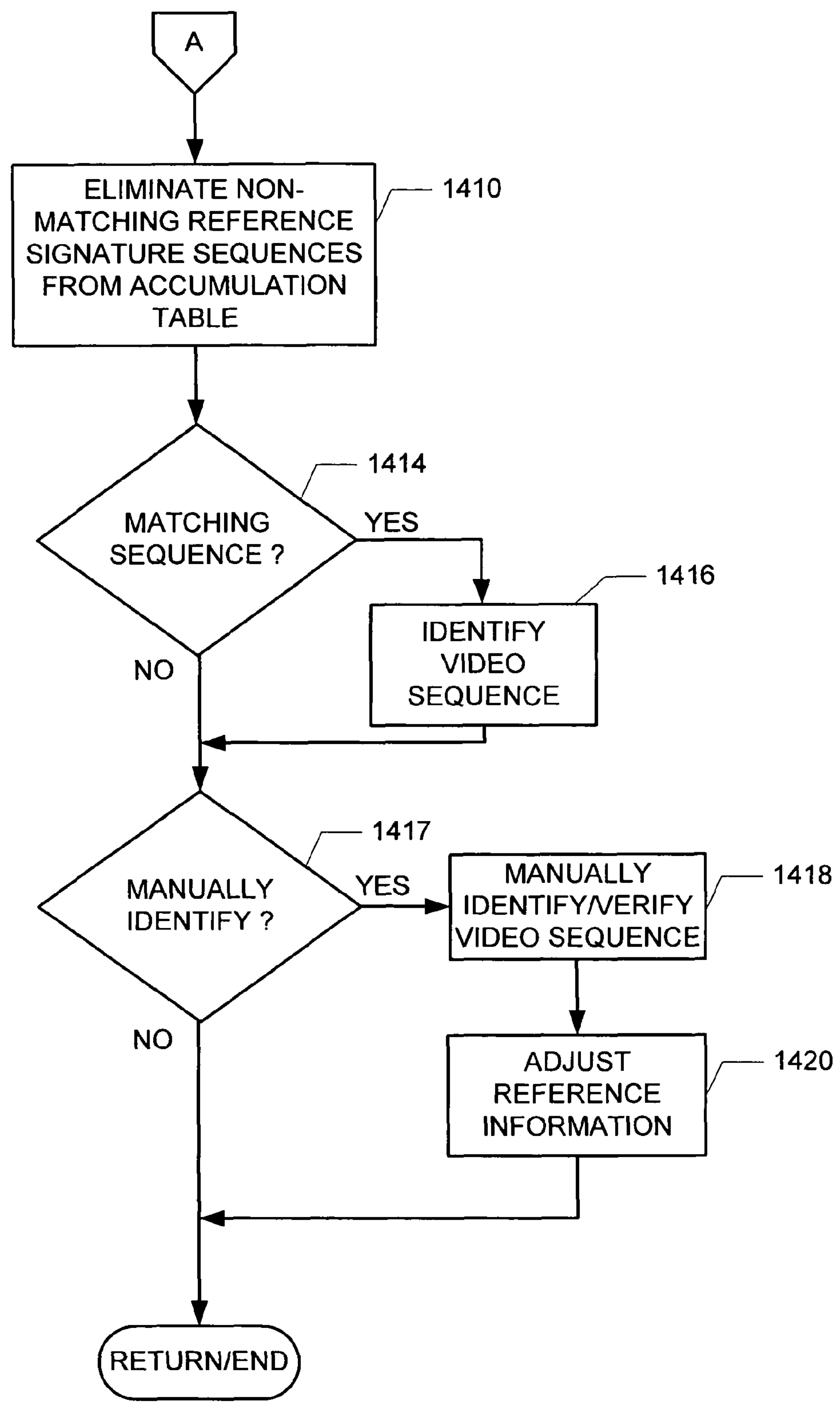

While the example method described in connection with FIGS. 14 and 15 is described as being executed within the central processing unit 210, some or all of the functions associated with the example method may be performed within the data acquisition unit 206 or any other device associated with the system 200 shown in FIG. 2.

Although certain methods, apparatus and articles of manufacture have been described herein, the scope of coverage of this patent is not limited thereto. To the contrary, this patent covers all methods, apparatus and articles of manufacture fairly falling within the scope of the appended claims either literally or under the doctrine of equivalents.

What is claimed is:

1. A method of identifying a video program, comprising:

receiving a sequence of signatures, wherein each of the signatures includes a set of centroids, wherein each set of centroids is derived from a corresponding one of a plurality of frames of the video program, and wherein each of the corresponding frames is selected based on a number or proportion of intra-coded blocks composing the frame;

comparing the sequence of signatures to a set of reference sequences of signatures; and identifying the video program based on the comparison of the sequence of signatures to the set of reference sequences of signatures.

2. A method as defined in claim 1, wherein each of the sets of centroids includes centroids associated with image components.

3. A method as defined in claim 1, wherein the image components are associated with a color model.

4. A method as defined in claim 1, wherein each of the sets of centroids includes centroids associated with a plurality of areas within its corresponding one of the plurality of frames.

5. A method as defined in claim 1, wherein comparing the sequence of signatures to the set of reference sequences of signatures includes comparing the sequence of signatures to each reference sequence of signatures.

6. A method as defined in claim 5, wherein comparing the sequence of signatures to each reference sequence of signatures includes sequentially comparing each signature within the sequence of signatures to each of the signatures within at least one of the reference sequences of signatures.

7. A method as defined in claim 1, wherein identifying the video program based on the comparison of the sequence of signatures to the set of reference sequences of signatures includes identifying the video program in response to identifying a matching sequence within the set of reference sequences of signatures.

8. A method as defined in claim 1, wherein identifying the video program based on the comparison of the sequence of signatures to the set of reference sequences of signatures includes providing textual information describing the video program.

9. A method of identifying a video program, comprising:

receiving a sequence of signatures, wherein each of the signatures includes a set of centroids corresponding to one of a plurality of substantially intra-coded frames of the video program;

comparing the sequence of signatures to a set of reference sequences of signatures; and identifying the video program based on the comparison of the sequence of signatures to the set of reference sequences of signatures, wherein identifying the video program based on the comparison of the sequence of signatures to the set of reference sequences of signatures includes manually identifying the video program in response to a failure to identify a matching sequence within the set of reference sequences of signatures.

10. A method as described in claim 9, further comprising adjusting at least one reference sequence of signatures from the set of reference sequences of signatures in response to different encoding methods.

11. A method as defined in claim 1, wherein video program is one of a television commercial and a television show.

12. A system for identifying a video program, comprising:

a memory; and a processor coupled to the memory and programmed to:

receive a sequence of signatures, wherein each of the signatures includes a set of centroids, wherein each set of centroids is derived from a corresponding one of a plurality of frames of the video program, and wherein each of the corresponding frames is selected based on a number or proportion of intra-coded blocks composing the frame;

compare the sequence of signatures to a set of reference sequences of signatures; and identify the video program based on the comparison of the sequence of signatures to the set of reference sequences of signatures.

13. A system as defined in claim 12, wherein each of the sets of centroids includes centroids associated with image components.

14. A system as defined in claim 13, wherein the image components are associated with a color model.

15. A system as defined in claim 12, wherein each of the sets of centroids includes centroids associated with a plurality of areas within its corresponding one of the plurality of frames.

16. A system as defined in claim 12, wherein the processor is programmed to compare the sequence of signatures to the set of reference sequences of signatures by comparing the sequence of signatures to each reference sequence of signatures.

17. A system as defined in claim 16, wherein the processor is programmed to compare the sequence of signatures to each reference sequence of signatures by sequentially comparing each signature within the sequence of signatures to each of the signatures within at least one of the reference sequences of signatures.

18. A system as defined in claim 12, wherein the processor is programmed to identify the video program based on the comparison of the sequence of signatures to the set of reference sequences of signatures by identifying the video program in response to identifying a matching sequence within the set of reference sequences of signatures.

19. A computer readable medium having instructions stored thereon that, when executed, cause a machine to:

receive a sequence of signatures, wherein each of the signatures includes a set of centroids, wherein each set of centroids is derived from a corresponding one of a plurality of frames of a video program, and wherein each of the corresponding frames is selected based on a number or proportion of intra-coded blocks composing the frame;

compare the sequence of signatures to a set of reference sequences of signatures; and identify the video program based on the comparison of the sequence of signatures to the set of reference sequences of signatures.

20. A computer readable medium as defined in claim 19, wherein each of the sets of centroids includes centroids associated with image components.

21. A computer readable medium as defined in claim 19, wherein each of the sets of centroids includes centroids associated with a plurality of areas within its corresponding one of the plurality of frames.

22. A method as defined in claim 1, wherein the frames are selected by scanning the plurality of frames for substantially intra-coded frames.

23. A method as defined in claim 22, wherein the scanning the plurality of frames comprises determining the extent to which the frames are intra-coded.

* * * * *